United States Patent [19]

Santandrea et al.

[11] Patent Number: 5,060,780

[45] Date of Patent: Oct. 29, 1991

[54] PALLETS FOR SUPPORTING WORKPIECES AND AUTOMATIC ADJUSTMENT OF PALLET WORKPIECE SUPPORT MEMBERS

[75] Inventors: Luciano Santandrea; Massimo Lombardi, both of Firenze, Italy

[73] Assignee: Axis U.S.A., Inc., Marlborough, Mass.

[21] Appl. No.: 490,826

[22] Filed: Mar. 8, 1990

Related U.S. Application Data

[63] Continuation-in-part of Ser. No. 326,158, Mar. 20, 1989, which is a continuation-in-part of Ser. No. 212,267, Jun. 27, 1988, abandoned.

[51] Int. Cl.⁵ .............................................. B65G 21/20
[52] U.S. Cl. .............................. 198/345.1; 198/465.2; 198/803.01; 269/56
[58] Field of Search ............... 198/339.1, 345.1, 345.3, 198/465.1, 465.2, 465.3, 803.01, 803.2, 803.3, 803.11; 29/33 P, 56.6, 760, 784, 281.1, 281.4, 281.6; 269/56, 296

[56] References Cited

U.S. PATENT DOCUMENTS

| | | | |
|---|---|---|---|
| 3,880,074 | 4/1975 | Seifert | 198/345.1 X |
| 4,014,428 | 3/1977 | Ossbahr | 198/465.3 X |
| 4,583,631 | 4/1986 | Yonezawa et al. | 198/345.3 |
| 4,626,160 | 12/1986 | Shiomi et al. | 198/345.3 X |
| 4,681,212 | 7/1987 | Miller | 198/465.3 X |
| 4,698,475 | 10/1987 | Lothenbach et al. | 198/803.01 X |
| 4,789,505 | 11/1988 | Tweedy | 198/803.01 |
| 4,803,882 | 2/1989 | Schonfeld et al. | 198/345.1 X |
| 4,844,237 | 7/1989 | Petersen | 198/465.1 X |

Primary Examiner—D. Glenn Dayoan
Attorney, Agent, or Firm—Robert R. Jackson; Eric C. Woglom

[57] ABSTRACT

A pallet having adjustable support members and an apparatus for automatically adjusting the distance between two support members for carrying workpieces of different dimensions. The support members are mounted on guides that are fitted to pallets that travel on conveyor transport systems for automatic production/assembly lines. In one embodiment the support members have a frictional locking mechanism which can be locked in place on the pallet and can be unlocked for movement along the guide. A positioning unit engages the pallet so that the locking mechanism is unlocked and the support members are engaged and translated to the desired locations under the control of a threaded bar. The locking mechanism has a first condition which causes the guide to contact the support members to secure frictionally the support members to the pallet and a second condition which permits the support members to be moved. A positioning unit engages the pallet to translate the support members to the desired locations. The location of the support members may be determined before adjusting the support members for the dimensions of the workpiece to be supported. A device for bringing a pallet and the positioning unit together to make the adjustment is provided.

71 Claims, 19 Drawing Sheets

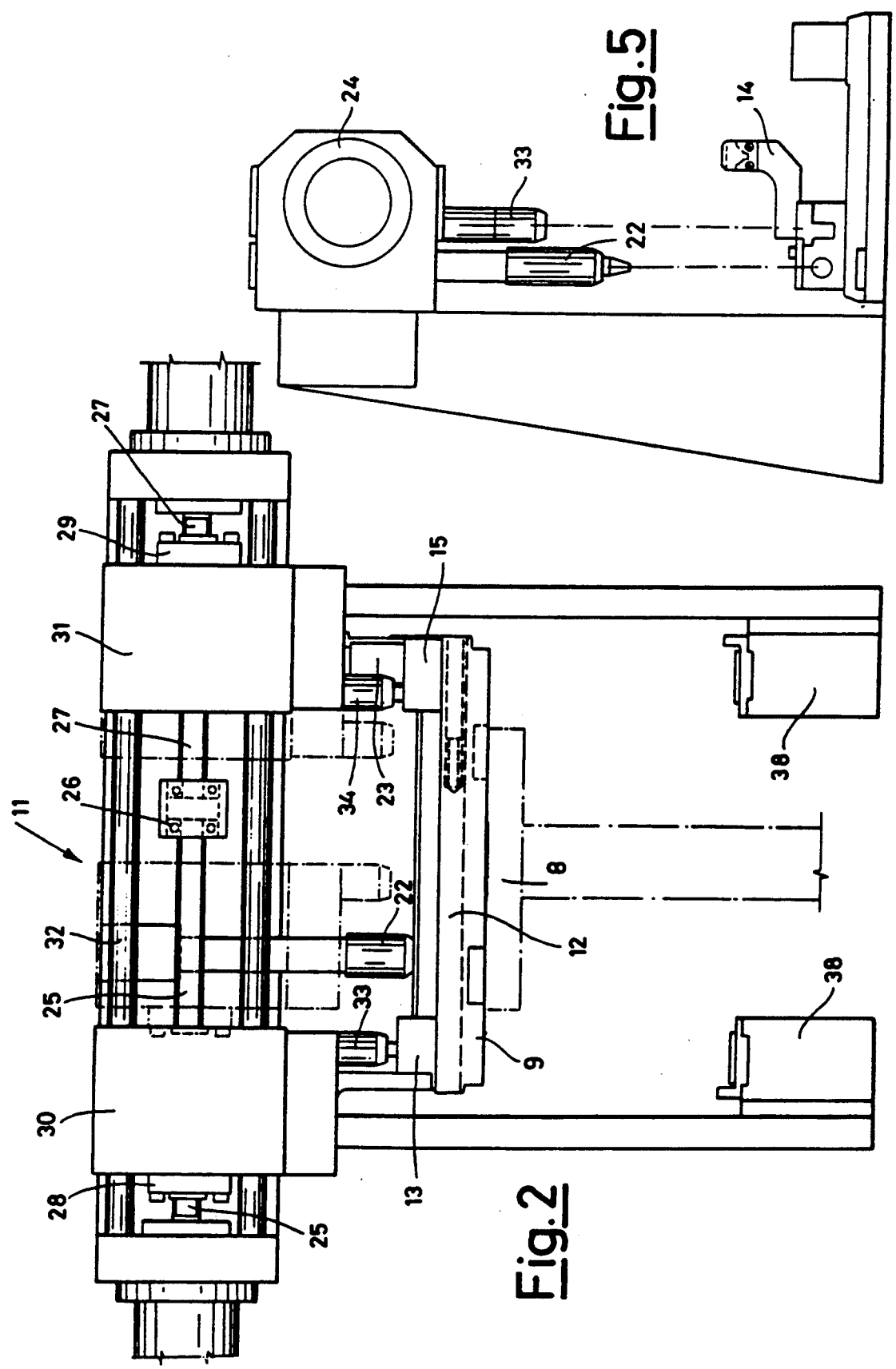

PALLETS FOR SUPPORTING WORKPIECES AND AUTOMATIC ADJUSTMENT OF PALLET WORKPIECE SUPPORT MEMBERS

CROSS REFERENCE TO RELATED APPLICATIONS

This application is a continuation in part of U.S. patent application Ser. No. 07/326,158 filed Mar. 20, 1989 in the names of Luciano Santandrea and Massimo Lombardi and entitled Automatic Adjustment of Pallet Workpiece Support Members which is a continuation in part of U.S. patent application Ser. No. 07/212,267 filed June 27, 1988 and now abandoned in the names of Luciano Sartandrea and Massimo Lombardi and entitled Apparatus For The Automatic Adjustment Of Pallet Workpiece Support Members.

BACKGROUND OF THE INVENTION

This invention relates to improvements in pallet conveyor production line systems including pallets that have support members that are adjustable for carrying workpieces of different dimensions, and particularly to a pallet that is adapted to carry different sized workpieces and apparatus and methods for the automatic adjustment of the distance between support members of such pallets.

Pallet conveyor systems are used in automatic production lines where workpieces are to be subjected to a sequence of operations at successive workstations. A workpiece that is to be assembled, machined, or operated on is placed on support members that are mounted on a pallet. The pallet is set upon a moving conveyor belt that will advance the pallet and the workpiece to a series of workstations that perform the sequence of desired operations to complete the production cycle. A plurality of pallets carrying a like plurality of workpieces are typically used.

The pallets are frictionally driven by the conveyor. As a workpiece is brought to a workstation, the pallet is stopped and the workstation operation is performed. While stopped, the pallet may continue to rest on the moving conveyor in sliding contact, or may be lifted off the moving conveyor belt. Depending on the desired operation, the workpiece may be worked upon while resting on the support members of the pallet, or it may be removed from the support members, worked upon, and then returned to the support members. At the conclusion of the operation, the pallet is released or placed back on the belt to advance to the next workstation. The pallets thus move asynchronously, i.e., pallets upstream of a stopped pallet will advance until they are stopped behind a stopped pallet while the conveyor continues to advance, individually or in sets or groups, and accumulate in order to wait their turn at the workstation. Alternately, the pallets may move synchronously with respect to one another.

Pallet conveyor production lines are adapted for performing the same operations on workpieces that belong to the same family of workpieces and require the same machining operations, even though the workpieces may differ in certain dimensions. It is known to provide the workstations with automatic adjustment devices that can receive workpieces of different dimensions and adjust for the differences in order to perform properly the desired operation. However, to maximize efficiency of production, workpieces are usually grouped and processed in sets according to the uniformity of certain dimensions. This minimizes the amount of changing-time and thus increases the rate of throughput of finished parts.

One of the problems with conventional pallet conveyor systems is that the support members on the pallets are manually adjusted for the dimensions of the particular workpieces for the production cycle. Conventional pallets have mechanical connecting links or fasteners that must be manually loosened so that the support members can be moved, and then refastened to secure the workpiece support members to the pallet in the proper location to support a workpiece. Thus, to change production from a set of workpieces having one uniform dimension to another, either the pallets must be adjusted while the pallets are advancing on the conveyor line or while pulled off the conveyor line. Alternately, the pallets may be replaced with a second set of pallets that are pre-adjusted for the dimensions of the next set of workpieces. Consequently, changing from one set of workpieces to another requires a significant slowdown or down-time in production.

Another problem with conventional production lines is that the manual adjustment procedure allows for error in the settings used from one pallet to the next. Consequently, the workpieces are not always properly or uniformly carried during the production cycle, which may result in differences in the quality of the finished products.

SUMMARY OF THE INVENTION

It is therefore an object of the present invention to provide an apparatus for automatically adjusting the position of the workpiece support members of a pallet to correspond to the dimensions of a workpiece.

It is another object of this invention to increase the efficiency of pallet conveyor production lines by rapidly and accurately adjusting the workpiece support members to the dimensions of the workpiece to be carried. It also is an object to provide for substantially the same spacing for the support members of pallets that are to carry workpieces of a set or group having certain uniform dimensions.

It is another object of this invention to provide an in-line support member adjustment apparatus and method that will not slow or interrupt production for workpiece change-over.

It is another object of this invention to provide a pallet with a locking means having a release mechanism that can be used to lock support members in place and easily unlocked to permit movement of the support members.

It is another object of this invention to provide a pallet with adjustable support members mounted on a guide wherein the support members are held securely in place against the pallet by the guide and wherein the guide can be temporarily moved away from the pallet to permit movement of the support members therealong.

It is another object of this invention to provide a pallet with adjustable support members mounted on a guide and to provide a positioning unit for engaging the pallet to translate the support members to their desired locations.

It is a further object to determine the location of the support members relative to a predetermined location and, if necessary, to move the support members to the desired locations for a selected workpiece.

In accordance with this invention, there is provided a pallet having at least two support members that are slideably mounted relative to the pallet and to each other, an elongated guide for controlling the direction of travel of the first and second support members, and means for releasably securing the first and second support members to the pallet or guide within an extreme range of positions selected to accommodate a range of workpiece dimensions appropriate for the given production line, the pallet having a first condition wherein the support members are frictionally held in place on the pallet, and a second condition wherein the frictional forces holding the support members are reduced so that the support members may be moved relative to each other to desired locations for supporting a selected workpiece to be carried by the pallet.

The support members may be mounted to or on the guide and the guide also may support the weight of the support members and any workpiece being carried.

The means for releasably securing the first and second support members includes a locking means so that each support member can be secured in place with no movement relative to the pallet, for example, at times other than when the location of the support members are to be adjusted, thereby maintaining the pallet in the first condition. The means also includes a release mechanism to unlock the support members so that each can be moved relative to the pallet to a desired location thereby placing the pallet in the second condition for the adjustment, and to lock the support members in place thereby placing the pallet in the first condition. In one embodiment, each support member may have an associated releasable securing means, which may be secured to the support member or to the pallet. In a preferred embodiment, the pallet may have one or more releasably securing means in fixed locations for locking and unlocking one or more support members.

In one embodiment, the guide is configured with a contacting surface extending along the length of the guide and the first and second support members are adapted to be mounted on the guide so that a portion of each of the first and second support members is disposed between the guide contacting surface and the pallet. The guide contacting surface may be flat, concave, convex or any other appropriate configuration. In this embodiment, the means for releasably securing the first and second support members to the pallet or guide includes a spring member connecting the pallet and the guide. The spring member has a preselected biasing force for urging the guide toward the pallet so that the guide contacting surface contacts portions of the first and second support members to hold frictionally the first and second support members in place on and to the pallet in the first condition. More than one spring member located at different positions along the guide may be used.

In a preferred embodiment, the guide is configured with an elongated smooth plow extending out from and along the length of the guide and the first and second support members are adapted to be mounted on the guide so that the guide plow extends at least partially over a portion of the first and second support members. The biasing force exerted by the spring member may be adjusted.

The means for releasably securing the support members also is adapted to have an unloaded condition wherein an external force acting on the spring member in opposition to the biasing force reduces the frictional forces holding the support members in place so that the support members may be moved along the guide and pallet manually or by an automatic positioning unit. This external force thus places the pallet in the second condition so long as the force is maintained.

A preferred embodiment of the spring member includes a pin, a cap and a spring wherein the pin passes through an aperture in the pallet surface, one end of the pin is secured to the guide. The other end of the pin extends through the pallet aperture beyond the other side, the spring is mounted over the pin on the other side of the pallet and the cap is secured to the pin so that the spring is in compression between the cap and the pallet surface and the guide is biased towards the pallet.

In a more preferred embodiment, the pallet has a plate surface, the elongated guide has a T-shaped cross section having a top cross member and a stem base and is arranged with the stem portion proximate to the top surface of the pallet plate surface and the cross member is adapted contact a portion of each support member. The releasably securing means includes a pin passing through an aperture in the pallet plate having one end attached to the stem of the T and the other end extending out the other side of the pallet surface plate, and the spring member is mounted over the pin on the other side of the pallet plate surface and restrained between the pallet surface plate and a cap that is secured to the end of the pin. Each of the support members has a corresponding receptacle or aperture, preferably T-shaped, adapted to receive a length of the guide cross member and to slide along the guide. Thus, the spring member exerts a biasing force which causes the cross member of the T to contact portions of the support members to urge the support members against the pallet surface. The support members may be provided with an opening or a slot so that the support members can be moved along the the guide and will thus not be stopped by the releasably securing means for holding the guide to the pallet.

Another aspect of the invention includes a release means for placing the pallet in the second condition so that the support members can be translated to desired positions. In one embodiment, the release means includes means for applying an external force to the means for releasably securing the first and second support members so that the support members may be translated. In an embodiment wherein the releasably securing means is a spring or resilient means, the release means preferably includes an actuator or air cylinder or the like adapted for contacting the spring means in opposition to the biasing force to reduce the forces locking the support member in place. More preferably, the release means includes a pushrod adapted to contact and push the cap or pin connected to the stem of a T-shaped guide with sufficient force to counteract the spring biasing force and optionally to overcome that force and move the guide relative to the pallet surface.

In accordance with another aspect of this invention, there is provided a system for the automatic adjustment of the distance between two workpiece support members of pallets to adjust for the different dimensions of the workpieces to be operated on by a given pallet conveyor production line. In this aspect, the invention concerns a pallet having support members and a first condition and a second condition as described above and a positioning unit for translating the support members when the pallet is in the second condition. The positioning unit may include and control operation of the release means for placing the pallet in the second condition.

Preferably, the positioning unit includes one means for translating for each support member on the pallet. In one embodiment of the positioning unit, the means for translating includes means for contacting the support members and moving the support members when the pallet is in the second condition to desired locations for a selected workpiece to be supported by the support members. One embodiment of the contacting means includes an extendable sleeve or pushrod having a contacting surface for contacting a support member. In this embodiment, each contacting surface may be adapted to interconnect temporarily with its associated support member so that, after contact is made, the pushrod can be further moved in either direction to place and release the support member at the desired location.

In another embodiment of the positioning unit, the contacting means includes a first pair of pushrods having a range of motion including a rest position and a fully extended position that are adapted to extend from their rest positions to their fully extended positions thereby to move the first and second support members, in the second condition, from their positions on the pallet to a reference location associated with the fully extended positions, and a second pair of pushrods having a range of motion including a rest position corresponding to the reference location and a fully extended position corresponding to the rest positions of the first pair of pushrods, the second pair of pushrods being adapted to move from their rest positions at the reference location to contact and move the first and second support members to their respective desired locations. Each pair of pushrods may move in the same direction or in an opposite direction and the respective first and second pairs have opposite motions. For example, the first pair of pushrods may be configured to move the first and second support members inwardly towards each other to their innermost positions and the second pair of pushrods move the support members apart to their desired locations. The second pair of pushrods may be precisely controlled by for example, a precision actuator that moves the pushrods directly to locations that move and place the support members at their precise desired locations. For another example, the advance of the second pair of pushrods may be halted by a pair of arresting blocks, fixed in place on a ruled guide at positions that will leave the support members at their desired locations. The location of the arresting blocks on the ruler may be manually set by an operator, or controlled automatically by a precisely controlled motor.

Optionally, the positioning unit includes control means for actuating the release means to place the pallet in the second condition for moving the support members and again to return the pallet to the first condition after an adjustment is made. The control means may be operated either before the support members are contacted or before the members are moved.

In a preferred embodiment, the means for translating includes (1) means for contacting the support members (2) means for determining whether or not the support members are in the desired locations for the selected workpiece, and (3) means for moving the support members relative to each other to the desired locations for the selected workpiece. In this embodiment, the means for contacting may be an extendable sleeve or pushrod having a contacting surface adapted to interconnect temporarily with its associated support member where it stops. The pushrod is connected to a linear measurement transducer such as a potentiometer.

In operation the pushrod is moved from an initial rest position until the contacting surface contacts a support member. The distance travelled is measured by the potentiometer which provides a signal corresponding to the location of the pushrod and, hence, the support member. The detected location is compared to the desired location. If a support member needs to be moved, the associated contacting surface is adapted to engage the support member and the pushrod is moved to move the support member to the desired location where the support member is released.

Another embodiment of the translating means includes (1) means for contacting the support members, (2) means for determining whether or not the support members are in the desired locations for the selected workpiece, and (3) means for moving one or more of the support members to the desired locations in response to the determination made by a determining means. One embodiment of the determining means comprises a microprocessor device for comparing a signal corresponding to a measured distance or location of a support members to a desired location for a selected workpiece and indicating whether or not support member must be moved and if so, to where.

In this embodiment, the moving means includes (1) reset means for translating the support members to respective reset or reference locations at predetermined locations on the pallet guide, for example, at one end of the extreme ranges of motion of the support members such as the innermost position for the first and second support members, and (2) locating means for translating the support members from their reset or reference locations to the desired locations for the selected workpiece. Preferably, the contacting means and the reset means may be the same element, for example, a pushrod having a contacting surface. In this embodiment, the locating means are precisely controlled to translate the support members independently to any of an infinite number of positions within their extreme ranges of travel. In contrast, the pushrod for contacting the support member and moving them to the reference locations innermost positions need not be precision controlled so long as contact is initially made while the pallet is in the first condition.

Also included in the system of the invention is a means for moving the pallet and positioning unit into and out of engagement so that when the pallet and positioning unit are in engagement, the means for releasably securing the support members and the release means may become engaged whereby the pallet is placed in the second condition so that the means for translating can translate one or both of the first and second support members along the guide relative to one another to the selected or desired locations, and so that when the pallet and the positioning unit are out of engagement the means for releasably securing and the release means may be disengaged whereby the first and second support members are maintained in the first condition in a fixed position relative to one another and the guide on the pallet.

For example, an engagement device may be provided which is a lifting means for raising and lowering the pallet between a lower position resting on the conveyor of the conveyor line and a higher position above the conveyor line. The higher position is adapted to bring the pallet into contact with the positioning unit as described herein. For another example, the engagement device may lower the positioning unit onto a pallet. For another example, the engagement device may move the positioning unit and the pallet horizontally relative to each other. In these embodiments, the release means may be a part of the lifting means, a part of the positioning unit, or a separate element disposed proximate to the pallet during the time the pallet and positioning unit are engaged.

In an alternate embodiment of the positioning unit, the contacting means includes a movable carriage that is adapted for engaging and interconnecting with a support member, and a drive means for translating the carriage so that when the pallet and positioning unit are interconnected and the pallet support members are in the second condition, movement of the carriage will move the support member of the pallet along the guide accordingly. In a preferred embodiment, the carriage has a bushing that is adapted to interconnect with a pin protruding from a support member.

In an alternate embodiment, the positioning unit comprises one releasing means, carriage, and bushing means for each support member so that when the pallet and positioning unit are engaged, each support member is released and engaged by a corresponding bushing and the support members can be adjusted simultaneously or independently.

The positioning unit may comprise only one carriage and bushing so that only one support member is moved at a time. In this embodiment, moving more than one support member would require multiple cycles under the positioning unit. Alternately, the positioning unit may have one carriage, the carriage having two bushings that are spaced apart, whereby one support member is engaged and adjusted by one bushing and the other support member is engaged and adjusted by the other bushing.

In operation, adjustment of the support members in accordance with one embodiment of the invention is carried out as follows. The positioning unit including contacting means, determining means and moving means is placed at a convenient location, preferably in-line with the production line, more preferably prior to where the workpiece is first placed on the pallet. The pallet is advanced below the positioning unit and raised from its lower position to the higher position by a lifting means such as an air cylinder.

When the pallet is in position the contacting means of the positioning unit makes contact with the support members. The determining means determines the locations of the support members and compares them to the desired locations for the selected workpiece to be supported by the pallet. If the determined locations match the desired locations, no change is made to the pallet support members and the pallet is lowered or returned to the conveyor and advanced to receive the selected workpiece. If the determined locations do not match the desired locations, then the release means engages the means for releasably securing the support members thereby placing the pallet in the second condition. The moving means then contacts one or more of the support member to be moved and translates them to the desired locations. Alternately, the release means could be activated as soon as contact is made or before contact is made so long as contact will not translate &he support members.

In the embodiment wherein the contacting means includes a pushrod and the moving means includes a reset means (which is the pushrod) and a locating means, each pushrod is first translated to contact its associated support member. If the support members are not at the desired locations, then the release means is actuated to place the pallet in the second condition and the pushrods are further translated to translate the support members to their respective reset or reference locations and then fully retracted to their rest positions, i.e., the outermost locations in their range of motion. The locating means are then actuated to translate the support members to the desired locations. Thereafter, pallet is returned to the first condition and the conveyor line to receive the selected workpiece.

The embodiment of the positioning unit having a carriage for engaging and interconnecting with a support member operates as follows. At about the same time (or before or after) the pallet is brought into contact with the positioning unit, the carriage of the positioning unit makes contact with and engages a portion of the support member, thereby interconnecting the positioning unit carriage and the support member of the pallet. The release means is actuated to place the pallet in the second condition and the drive means of the positioning unit is then actuated to move the carriage, and hence, the support member, to the position associated with the particular dimensions for the workpiece that is to be placed on the pallet. Once the support member is in the proper location, the drive means is stopped and the pallet is lowered. The carriage and the support members and the release means respectively disengage. The pallet is thus placed in the first condition and lowered to the conveyor.

The positioning unit drive means for moving the support& members to the desired locations may comprise a motor, preferably a stepper motor, that can rotate a screw mechanism with precise control to advance or retract a member such as an arm, a pushrod (or sleeve) or a carriage along the screw to an infinite number of intermediate positions within a range of extreme positions. Alternately, the drive means could operate a linear motion device with precise control to advance or retract a pushrod or carriage to an infinite number of intermediate positions within a range of extreme positions. Thus, the drive means permits precise automatic adjustment of the support members for a large number of workpieces having certain uniform dimensions. It also provides for consistent positioning from pallet to pallet for identically dimensioned workpieces. Computer control of the drive means enhances the automation and precision of operation.

In accordance with a different embodiment of the present invention, the pallet is modified in a different manner than in the above embodiments as follows. The support members are secured to sliding blocks that have a threaded surface. The blocks are mounted on a guide that includes a threaded bar that engages and cooperates with the threaded surfaces of the blocks. The blocks slide or translate along the guides of the pallet in response to the rotation of the threaded bar. Means for rotating the threaded bar is provided.

Preferably, a separate threaded bar is used for each support member and sliding block arrangement and the sliding blocks have internally threaded passageways through which the threaded bars pass so that the support members may be independently moved. The threaded bars are preferably mounted in a housing of the pallet to be rotatable and in axial alignment. The threaded bars are rigidly secured to respective toothed gears that rotate in a fixed plane around a fixed point and are adapted to engage corresponding toothed gears on the positioning unit as described below for controlled rotation of the threaded bars and movement of the support members.

The threaded bars, gears, and sliding blocks are preferably substantially enclosed by the housing. The housing includes an aperture through which the support members extend and move along the pallet. There also is an aperture arranged proximate to each toothed gear so that the corresponding toothed gears of the positioning unit can engage the pallet gears in the housing. The housing substantially protects the support member interconnections from damage or clogging due to extraneous material.

In this embodiment, movement of the support members is substantially minimized except during intentional adjustment of the members. This occurs as a result of the forces between the support members on the housing and the threaded bars and the threaded surfaces of the sliding blocks which combine to create a threshold frictional force that, under normal pallet conveyor operations, substantially prevents the support members from moving. When the support members are supporting a workpiece, the frictional forces are increased, thus further minimizing the likelihood of any unintended movement of the support members. However, the frictional forces are not sufficient to prevent intentional movement of the support members under the control of the positioning unit as described below.

The positioning unit of this embodiment of the invention includes toothed gears in relatively fixed positions that are adapted to pass through the housing apertures and engage the toothed gears of the pallet. The gears thus remain in a fixed location and rotate about their axes to rotate the threaded bars to move the support members. In this embodiment, each positioning unit toothed gear is controlled by separate motor so that each gear, and hence, each support member, can be independently moved. Each gear also has an adapting motion to facilitate engagement of the gears before torque is applied to move the support members.

The positioning unit also may include means for determining the location of the support members relative to a predetermined location prior to adjusting the location of the support members. This information can be used to enhance the speed, accuracy and efficiency in adjusting the support members to the proper locations. Preferably, the means includes one movable sleeve mounted on a shaft associated with each support member. The sleeve is advanced from a preselected location until it contacts an outward surface of the support member. The distance is then calculated and the location of the support member is determined. The positioning unit then can calculate the distance and direction that the support member is to be moved to be in the proper location, and then actuate the motor to advance the gears to move the support member accordingly. The means for determining the location of the support members also may be used with any embodiment of the present invention.

In operation, adjustment of the support members in accordance with the second embodiment of the invention is carried out as follows. The positioning unit is placed at a convenient location, preferably inline with the production line, more preferably prior to where the workpiece is first placed on the pallet. The pallet is advanced below the positioning unit and raised from its lower position to the higher position. As the pallet approaches the higher position, the toothed gears of the positioning unit and the pallet housing engage.

As or after the gears have engaged, the means for determining the location of the support members determines their location, preferably by advancing the movable sleeves until the sleeves contact the respective support members and measuring the distance respectively travelled from their predetermined locations. The determined distances are then used to create appropriate control signals for actuating the separate motors to rotate the respective gears to place the support members in the proper locations.

After the support members are in the proper location, the pallet is lowered, whereby the gears disengage, whereupon the support members will remain in place. Once in the lowered position, the workpiece may be lowered onto the support members and the pallet advanced to begin the production cycle.

The pallet of the present invention also may be equipped with a means for lifting the work piece rapidly, to take it to a workstation for operation, and subsequently return the workpiece to the pallet. This device reduces the amount of time required to perform the operation at the workstation as compared to the time required for the workstation to perform the operation while the workpiece is held by the pallet.

A microprocessor may be conventionally used to control the alignment and movement of the various elements of the apparatus, to identify the dimensions of the workpiece and the prior position of the support members, and to control the positioning unit movements.

Thus, the modified pallets and the positioning unit of the present invention provide for rapid, accurate and repeatable adjustments of workpiece support members, whether successive workpieces are of the same or different dimensions.

BRIEF DESCRIPTION OF THE DRAWINGS

The above and other objects and advantages of the invention will be apparent upon consideration of the following detailed description, taken in conjunction with the accompanying drawings, in which like reference characters refer to like parts through out, and in which:

FIG. 2 is a front view of the embodiment of FIG. 1 showing the pallet and positioning unit engaged;

FIG. 5 is a side view of the embodiment of FIG. 1.

DETAILED DESCRIPTION OF THE INVENTION

Figure 1:
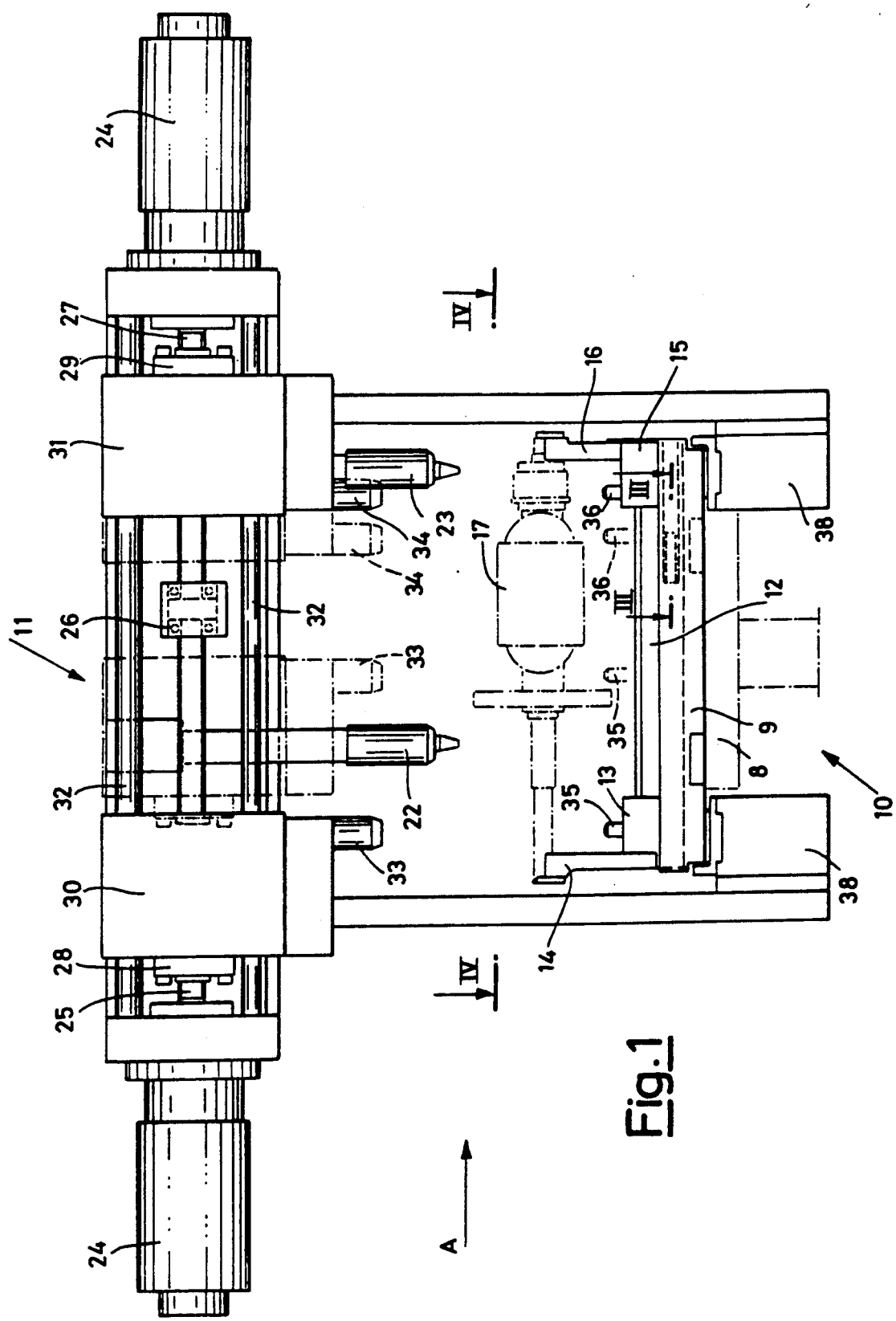
FIG. 1 is a front view of an illustrative first embodiment of the pallet and positioning unit of the present invention.

The following discussion refers to a single pallet, but it is to be understood that the discussion extends to a plurality of similar pallets, each of which cooperates with the positioning unit.

As shown in FIGS. 1-5, one embodiment of this invention comprises pallet 10 and positioning unit 11. Pallet 10 includes plate 9 and guide channels 12, mounted on plate 9, adapted for slideably receiving support members 13 and 15. Support members 13 and 15 have respective arms 14 and 16 that are adapted to support workpiece 17 as it is transported from workstation to workstation in the production cycle. In the preferred embodiment, workpiece 17 comprises an armature for an electric motor and the production line machines armatures.

Figure 3:
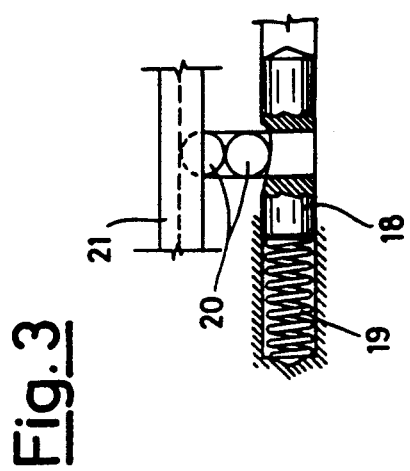
FIG. 3 is a cross-sectional view of a locking means of the embodiment of FIG. 1.
Figure 4:
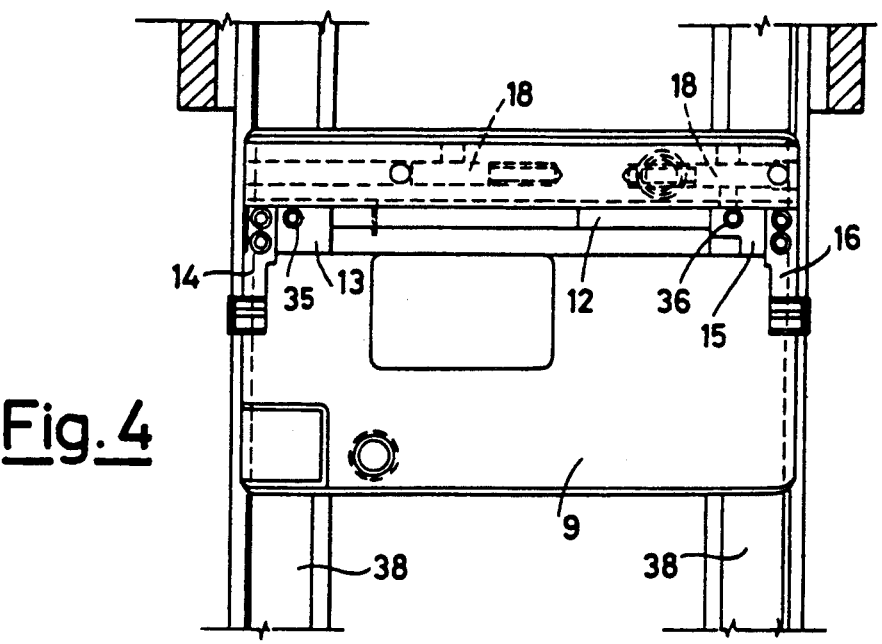
FIG. 4 is a top sectional view taken along line III—III of FIG. 1.

Each support member has an associated locking means for locking the support member in the programmed position, preferably a friction locking mechanism, including a release mechanism that can be activated to unlock the support member, preferably overcoming the frictional locking force. The locking mechanism may be operated independently or simultaneously. Referring to FIG. 3, such a locking system includes wedge 18 urged by spring 19 against element 20 that is inserted in a slot obtained in small plate 21 that is integral to the support member.

Referring to FIGS. 2 and 3, actuating the release mechanism of the locking means occurs by raising pallet 10 until pins 22 and 23 extending downwardly from positioning unit 11 contact and translate respective wedges 18 to overcome the action of springs 19. This action releases locking element 20 from the slot of small plate 21, thereby removing the frictional force locking the support members in place and enabling the displacement of support members 13 and 15. At this point, support members 13 and 15 may be moved by positioning unit 11 to the desired position along guides 12. Pins 22 and 23 may be fixedly mounted on positioning unit 11 to correspond to the fixed locations of locking means wedges 18 on pallet 10.

In an alternate embodiment (not shown) the locking mechanism could be mounted on the support member and the cooperating slot located in the pallet so that the lock translates with the support member. In this embodiment, pins 22 and 23 could be made separate projections extending from carriages 30 and 31 at locations corresponding to the location of the lock on the support members. It also is contemplated that pins 22 and 23 could be disposed interior to bushings 33 and 34 (described below) and the locking means located interior to the portions of the support members that will be engaged by bushings 33 and 34.

Positioning unit 11 also includes two actuators 24 that control the rotation of respective screws 25 and 27 that are coaxial and face each other on a common rest 26 on which they are fitted with bearings (not shown). Screws 25 and 27 engage respective interiorly threaded bosses or apertures 28 and 29 integral to carriages 30 and 31. Carriages 30 and 31 are thus driven by the rotation of screws 25 and 27 along guides 32.

Carriages 30 and 31 have respective bushings 33 and 34 having receptacles that are adapted to engage pins 35 and 36 of support members 13 and 15 respectively, thereby interlocking carriages 30 and 31 with support members 13 and 15. When engaged, movement of carriages 30 and 31 along guides 32 will displace support members 13 and 15 along guide channels 12. Actuators (drive means) 24 control the movement and position of carriages 30 and 31 throughout the full range of travel. This provides the ability to place the carriages in a reference position, e.g., corresponding to the initial position of the support members, and then move the carriages and the engaged support members to a desired, programmed position, e.g., corresponding to the dimensions of the workpiece.

Assuming the first workpiece 17 is to be replaced with a second workpiece having different dimensions, the operation proceeds as follows. First workpiece 17 is removed from arms 14 and 16 by actuators (not shown). To displace support members 13 and 15, it is necessary that no workpiece 17 be resting on arms 17 and 19. The position of the pallet support members 13 and 15 are determined and carriages 30 and 31 are moved to corresponding positions. Pallet 10 is lifted from a lower position on conveyor belt 38 by lifting means B and piston 37 and is taken to a higher position (shown in FIG. 2) where pins 22 and 23 engage the corresponding respective wedges 18 of support members 13 and 15, pushing them and compressing springs 19. In this way, small plates 21 are released from the locking elements 20, thereby allowing support members 13 and 15 to slide along guide channels 12.

At about the same time, or before or after, bushings 33 and 34 of carriages 30 and 31 engage pins 35 and 36 as shown in FIG. 2. Thus, support members 13 and 15 can be translated by operating one or both of actuators 24 as illustrated by the dashed lines in FIG. 2 representing the minimum distance between carriages and the full lines representing the maximum distance.

After the carriages and support members have been moved to the desired, programmed positions, pallet 10 is lowered onto conveyor 38. As pallet 10 is lowered, pins 22 and 23 disengage from their respective locking means release mechanisms so that wedges 18 are again forced against elements 20 by springs 19, thereby locking support members 13 and 15 into position. Carriages 30 and 31 may be left in the recently programmed position to begin again the releasing and repositioning operations if it becomes necessary to modify the distance between arms 14 and 16 to machine a new workpiece 17.

Figure 6:
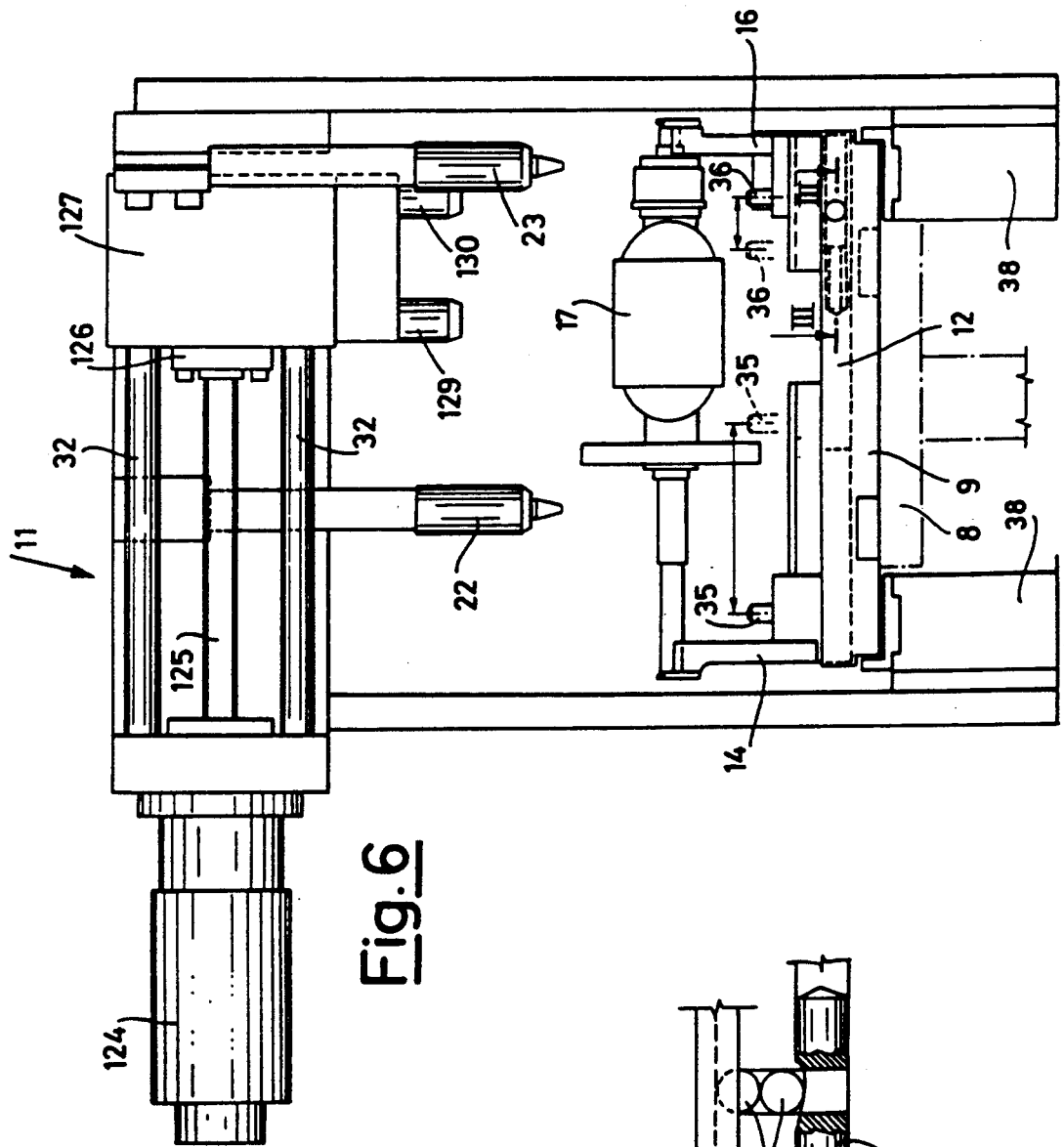
FIG. 6 is a front view of a second illustrative embodiment of the pallet and positioning unit of the present invention.
Figure 7:
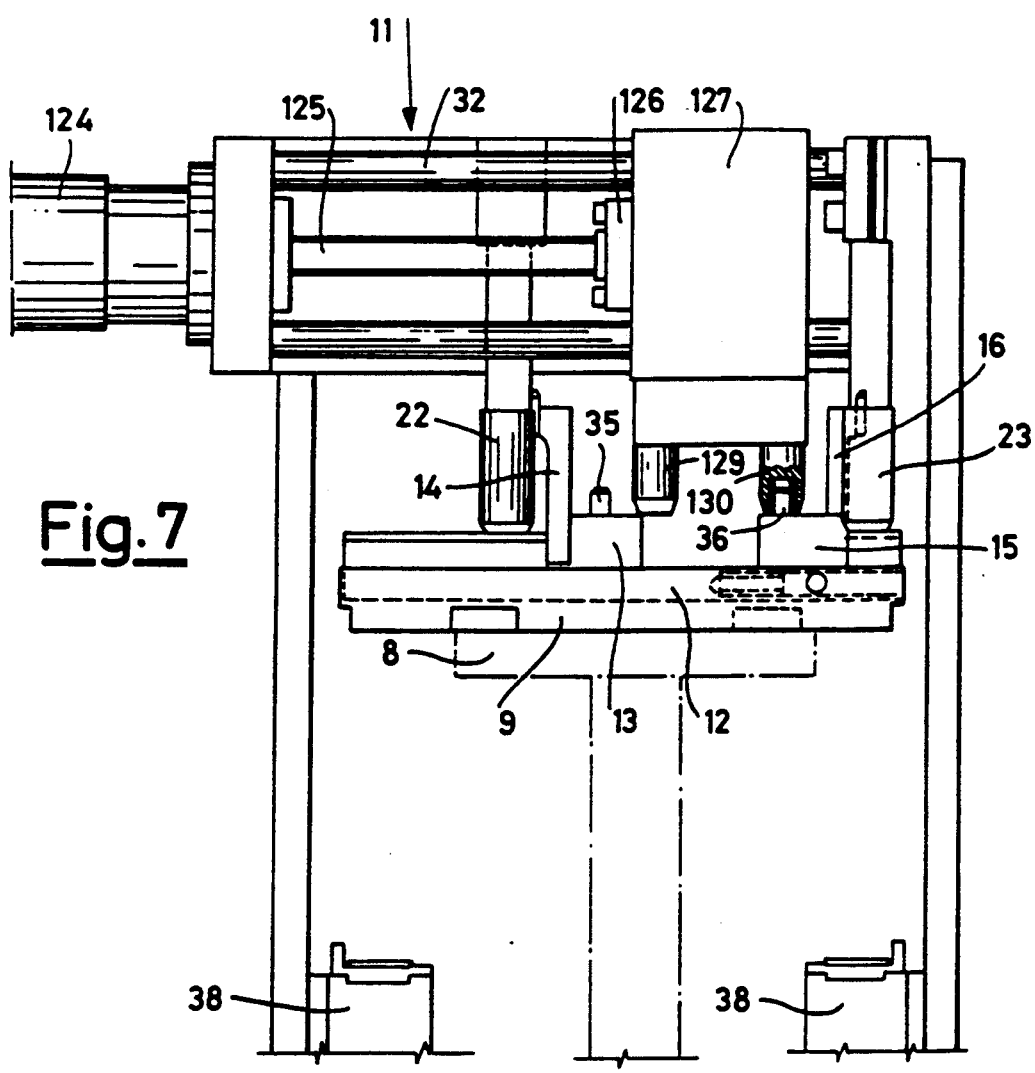
FIG. 7 is a front view of the embodiment of FIG. 6 showing the pallet and positioning unit engaged.
Figure 8:
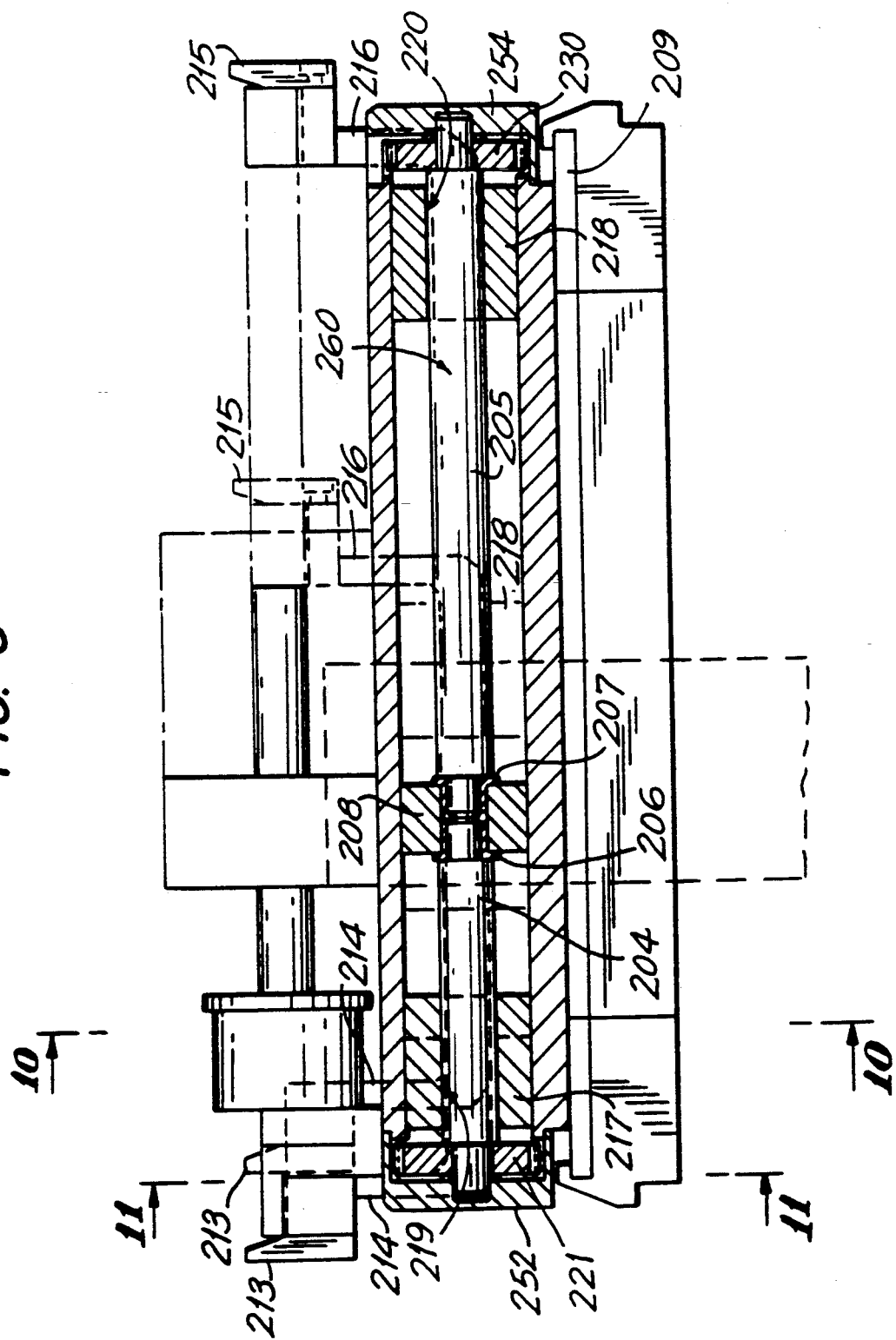
FIG. 8 is a front sectional view of a second embodiment of the pallet of the present invention.
Figure 9:
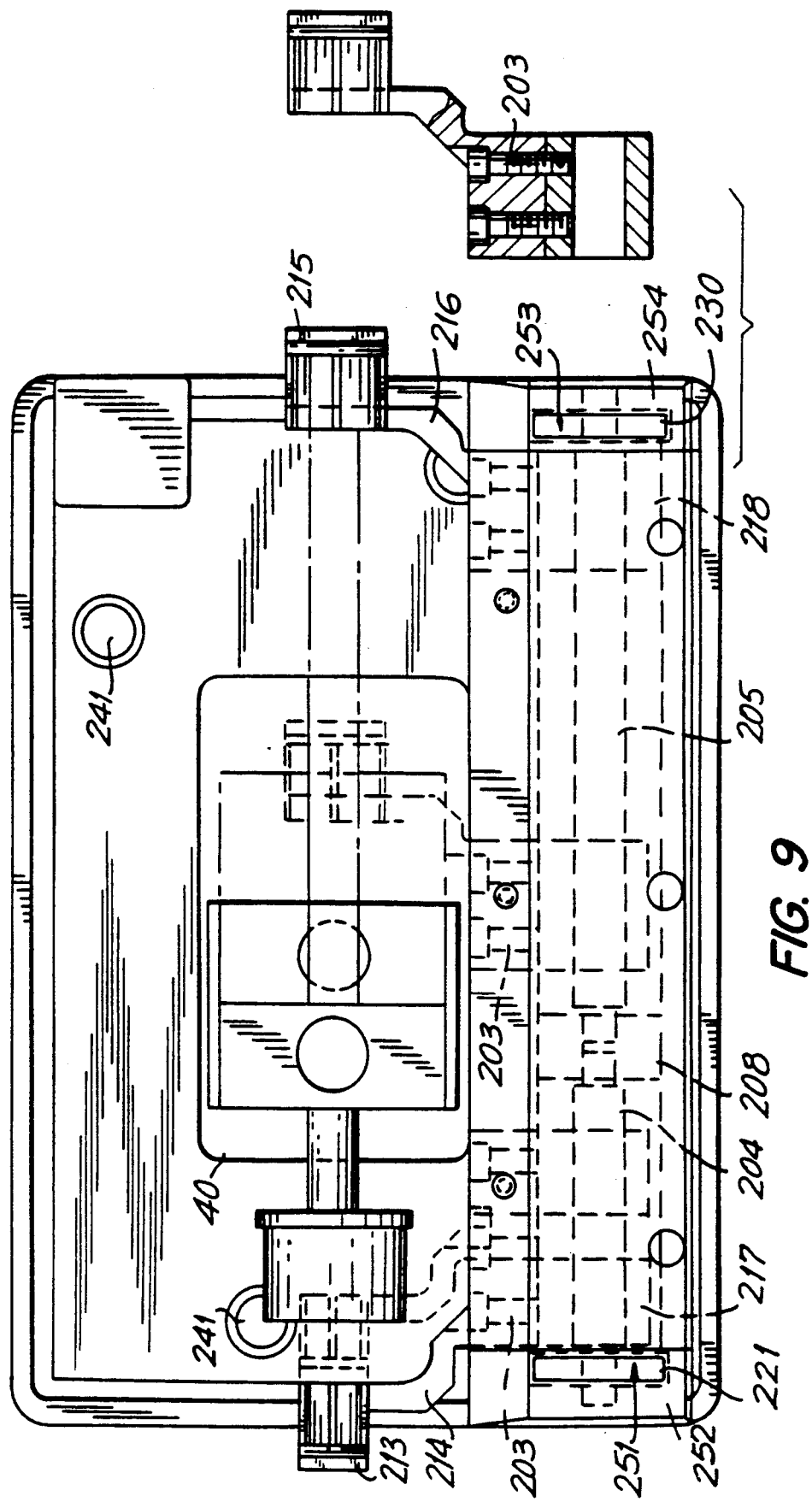
FIG. 9 is a top view of FIG. 8.
Figure 10:
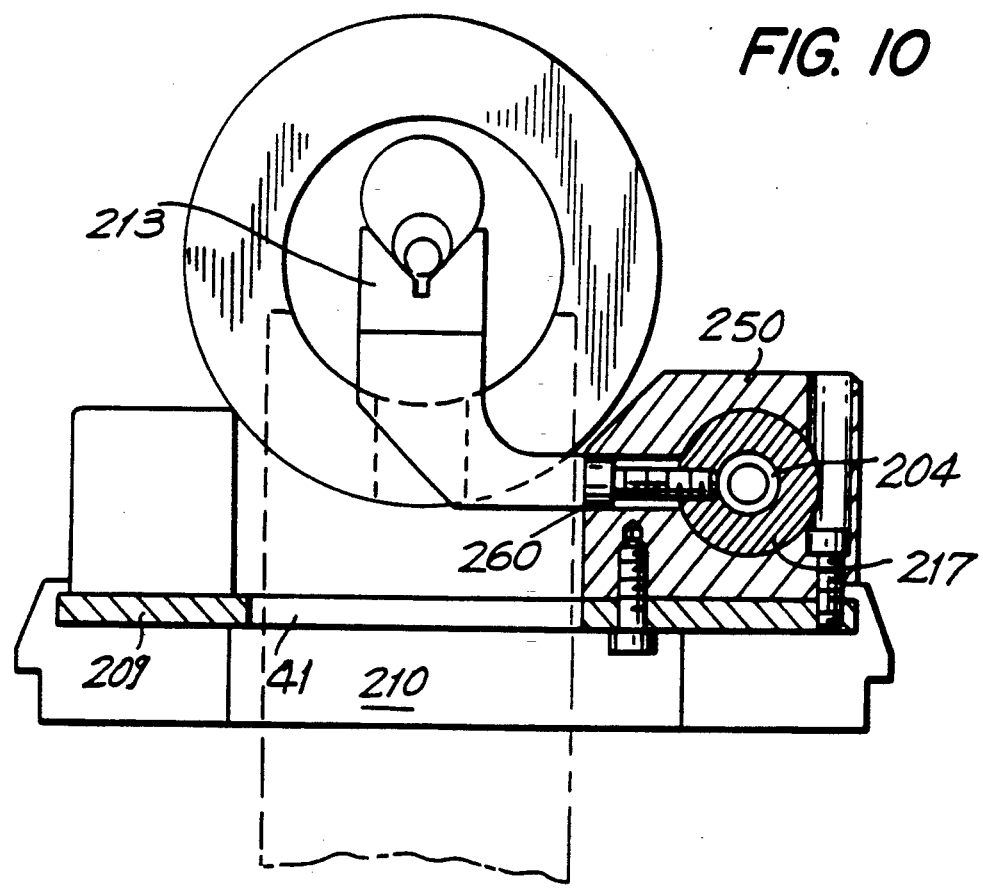
FIG. 10 is an end sectional view taken along line 10—10 of FIG. 8.
Figure 11:
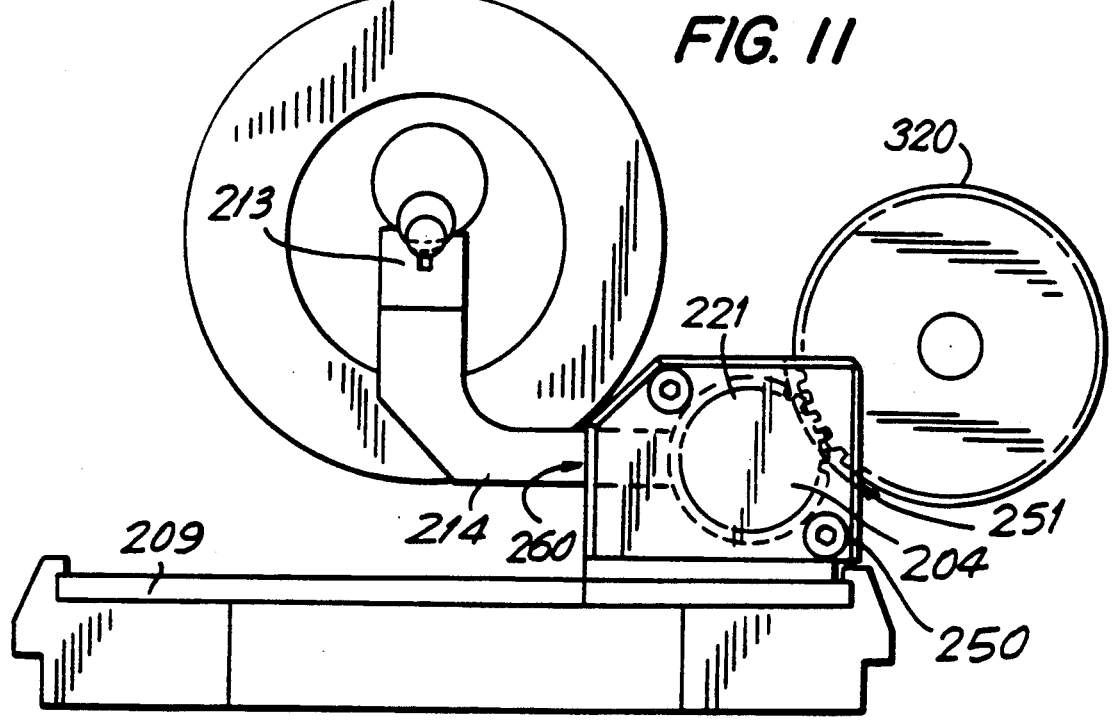
FIG. 11 is an end sectional view taken along line 11—11 of FIG. 8.
Figure 12:
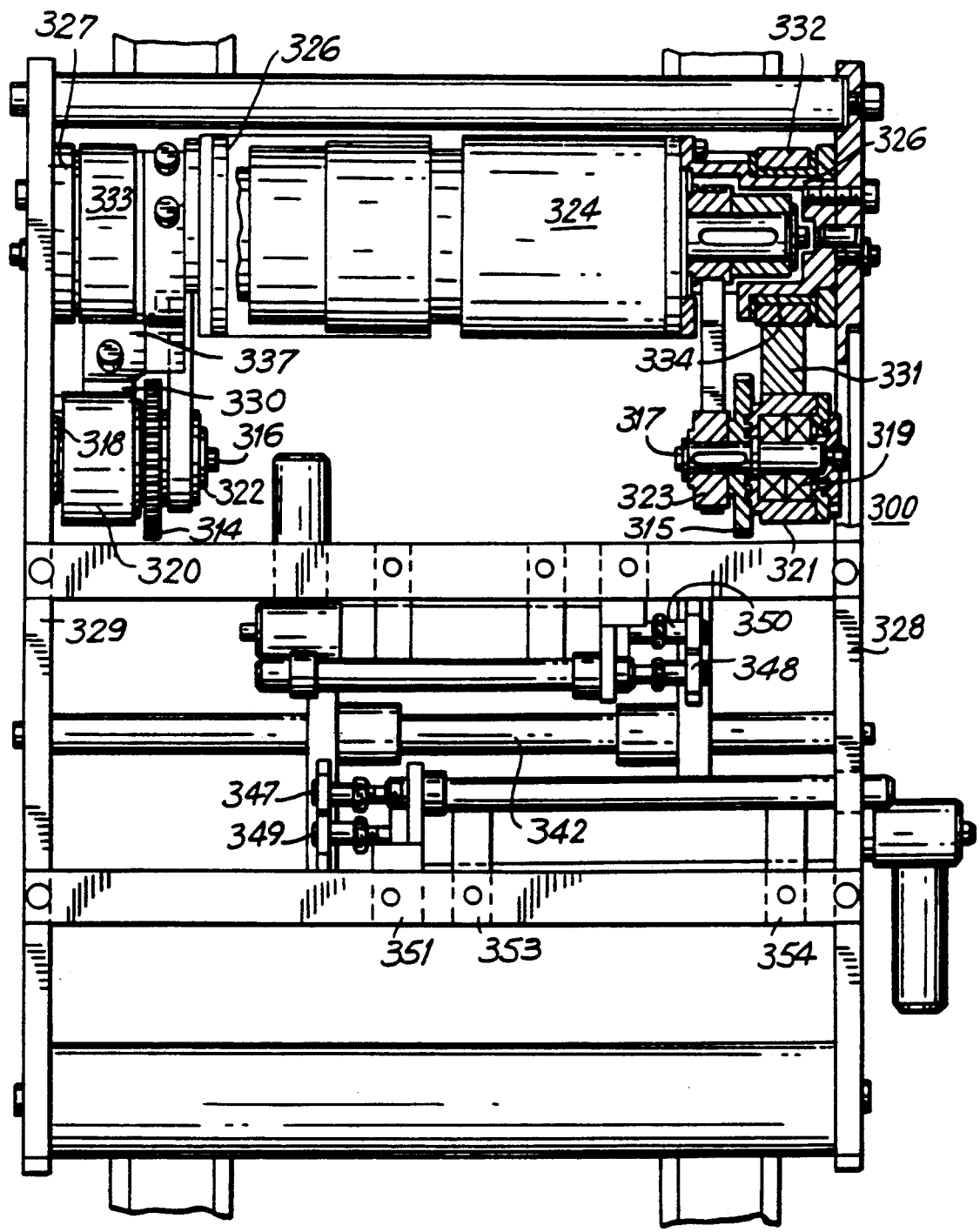
FIG. 12 is a partial sectional top view of a positioning unit of the second embodiment of the present invention.

An alternate first embodiment of this invention is shown is FIGS. 6 and 7. In this embodiment, positioning unit 11 comprises only one actuator-carriage assembly wherein actuator 124 drives screw 125 on which an internally threaded boss or aperture 126 is assembled integral to carriage 127. Carriage 127 includes bushings 129 and 130. As shown in FIG. 7, when pallet 10 is raised by lift means 8, pins 22 and 23 release the locking means of support members 13 and 15. However, only one of the two bushings 129 or 130 will engage one of pins 35 or 36. Thus, carriage 127 will displace only the support member that is engaged, as it is driven by actuator 124.

To move the other support arm, pallet 10 is lowered and carriage 127 is moved so that the other of the bushings 129 or 130 will engage the other of pins 35 or 36 when pallet 10 is raised again to move the other of support member 13 or 15 to the desired position. Although this embodiment relies upon two successive operations of lifting and lowering of pallet 10, the same result of placing arms 14 and 16 of support members 13 and 15 for receiving the appropriate workpiece 17 is obtained. This embodiment is appropriate when rapid changes of position are not required.

The positioning unit described in each of these embodiments permits positioning the support members to an infinite number of positions between the minimum and maximum of the range of travel of support members 13 and 15.

Referring to FIGS. 8–15, a second embodiment of the present invention comprises pallet 210 and positioning unit 300. As shown in FIGS. 8–11, pallet 210 includes plate 209, housing 250, and support members 213 and 215. Housing 250 has an elongated aperture 260 along one side of its length that extends along pallet 210. Support members 213 and 215 are respectively connected to arms 214 and 216, which are respectively connected to slide blocks 217 and 218 by screws 203. Arms 214 and 216 extend through and slide along aperture 260 in housing 250. Aperture 260 is preferably located in a wall of housing 250 that is protected so that falling matter, such as metal scraps, waste materials or lubricating fluids that exist commonly in pallet conveyor line operating environments, will not fall into aperture 260 or otherwise interfere with the adjustment mechanisms. For example, a vertical wall, or an overhanging wall may be used.

Slide blocks 217 and 218 are disposed interior to housing 250 and have respective threaded passageways 219 and 220. Threaded bars 204 and 205, rotatably mounted in housing 250, are configured to pass through, mesh with, and engage respectively threaded passageways 219 and 220 so that sliding blocks 217 and 218 translate along threaded bars 204 and 205 as the bars are rotated. Gears 221 and 230 are respectively rigidly connected to threaded bars 204 and 205, interior to housing 250, to provide a means for rotating bars 204 and 205. Gears 221 and 230 are in fixed positions relative to the sliding blocks and are adapted to rotate about the axis of their respective bars and also are preferably located close to the outward ends of their respective bars.

Housing 250 includes two apertures 251 and 253 which are positioned relative to gears 221 and 230 to provide access to gears 221 and 230 to rotate gears 221 and 230.

In the preferred embodiment, bars 204 and 205 are independently rotated so that slide blocks 217 and 218 may be independently moved. Threaded bar 204 is supported at one end by bushing 206 and at the other end by a seat in end 252 of housing 250. Threaded bar 205 is similarly supported at one end by bushing 207 and at the other end by a seat in end 254 of housing 250, in axial alignment with bar 204.

Arms 214 and 216 are preferably provided with a bearing surface that interacts with an opposing bearing surface of housing 250 at the perimeter of aperture 260. The bearing surface of housing 250 provides support for support members 213 and 215, holds the support members in place, and provides a guide surface so that arms 214 and 216 can move along aperture 263 of housing 250 under the control of positioning unit 300. Because the desired movement of arms 213 and 215 occurs in an unloaded condition, i.e., without a workpiece, a smooth metal to metal sliding contact may be made.

In this regard, the weight of the support arm on the housing bearing surface and the contact between the threaded bars and the sliding blocks create forces that substantially prevent the support members from moving inadvertently or unintentionally, once placed in a desired location by the positioning unit. The frictional forces are, however, overcome by the positioning unit which provides sufficient power to rotate the threaded bars to move the support member or members. When the support members are loaded with a workpiece, the static frictional forces increase, thus further ensuring that the support member will remain in its desired location and support securely the workpiece. Thus, the support member is substantially maintained in the position in which it is left by the positioning unit, whether or not it is carrying a workpiece. In an embodiment where the construction of the pallet would provide a static frictional force larger than is desired, a friction reducing material or composition, e.g., polytetrafluoroethylene, may be interposed between the contacting or bearing surfaces to reduce the forces required to move the support members along the aperture 260 or threaded bars 204 or 205.

Slide blocks 217 and 218 also may be provided with a contoured surface that corresponds to the interior contours of housing 250 so that any rotation of blocks 217 or 218 about threaded bars 204 or 205, as would occur with a weight on the support members, is substantially minimized, to add a static frictional force component, and to reduce or better distribute the load bearing forces on the pallet elements. The latter also will reduce wear on the overall pallet mechanism. However, such contoured surfaces should not have tolerances so tight that it will impair translational movement of blocks 217 or 218 or arms 214 or 216 along the longitude of threaded bars 204 or 205, and hence along housing 250 of pallet 210.

In the preferred embodiment the threaded bars have only a motion imparting function and prevent undesired movement of the support members. Moments derived from external forces are discharged as a couple, where one action is discharged on the longitudinal support bearing surface and the other is discharged on the housing. In an alternate embodiment, the threaded bars may have a load-bearing and guiding function in addition to controlling the movement of the support members.

Pallet 210 may be lifted from a position on a conveyor belt by a lifting means (not shown in FIGS. 8–15) and lifting bores 241 and may include an aperture 40 to provide for lifting workpieces off the support members to a workstation and then lowering the workpieces onto the support members from below pallet 210. Lifting bores 241 assist in the proper alignment of pallet 210 as it is raised and lowered between the conveyor and a workstation or positioning unit 300.

Figure 13:
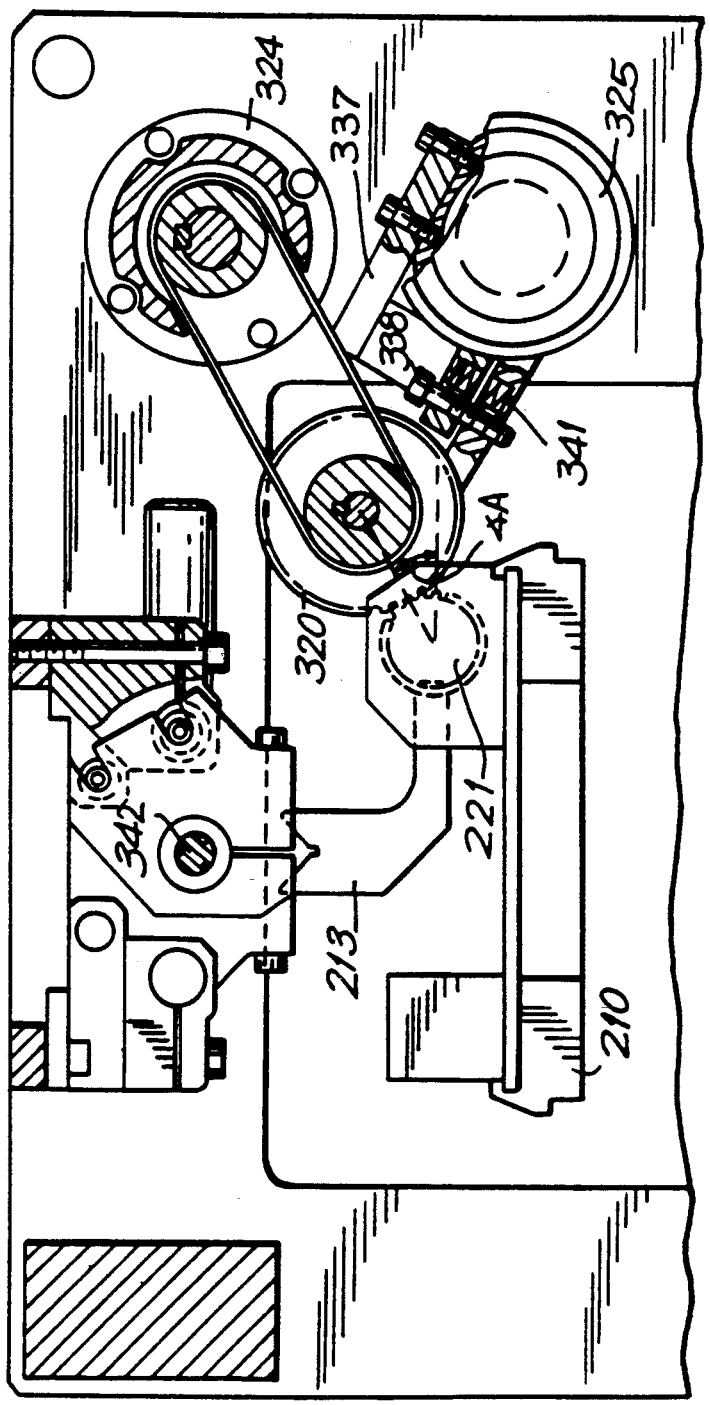
FIG. 13 is a side view of the gear engagement position of a pallet and positioning unit of the second embodiment of the present invention.

Referring to FIGS. 11–15, positioning unit 300 includes toothed gears 314 and 315 that are disposed on either side of the longitudinal axis of the conveyor that are adapted for passing through apertures 252 and 253 to contact and engage toothed gears 221 and 230 of pallet 210. Referring to FIG. 13, in the preferred embodiment, gears 314 and 315 are arranged to contact gears 221 and 230 at an angle A relative to the vertical axis. Angle A provides for a force component that facilitates insertion of the teeth of the cooperating gears. An angle of contact A of about 50 to about 70 degrees relative to the vertical axis, preferably about 60 degrees, have been found to be satisfactory.

Gears 314 and 315 are mounted on shafts 316 and 317 which are supported by bearings 318 and 319 in housings 320 and 321 of gear arms 330 and 331. On the free ends of shafts 316 and 317 are toothed flywheels 322 and 323, which are connected to motor and reduction gear drives 324 and 325 by belts, thus forming a transmission. The belt transmission provides for delivering the torque to gears 314 and 315 needed to overcome the static frictional forces. Drive units 324 and 325 are connected to one end of side support members 326 and 327, which are fixed to lateral frame plates 328 and 329. The motors are preferably DC motors having a tachometer and encoder for determining and controlling speed and angular position control of the motor driveshaft. Preferred motors include, for example, Parvex model RE 220 motors manufactured in France. The drive and belt transmission units are conventional devices known to those of skill in the art, and accordingly are not discussed further here.

Gear arms 330 and 331 have collar ends 332 and 333 which journal by means of bushes 334 and 335 on external surfaces of side support members 326 and 327. Arms 330 and 331 also are fixed to auxiliary frame plates 336 and 337 (see FIG. 13) by means of registering screws 338 and 339. Springs 340 and 341 are interposed between arms 330 and 331 and respective frame plates 336 and 337 in order to have a controllable force and an adapting motion during the engagement phase of gears 221 and 230 of pallet 210 and gears 314 and 315 of positioning unit 300. The adapting motion provides for engagement of the gears before applying motor torque to rotate the gears.

Figure 14:
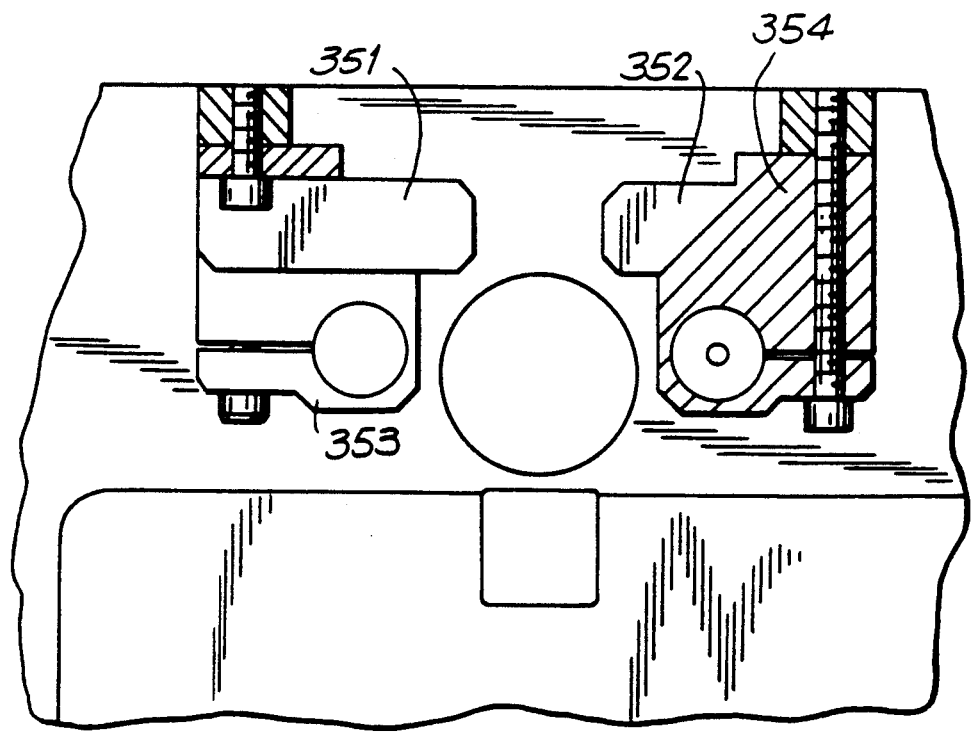
FIG. 14 is side view of the cylinder and transducer elements of FIG. 12.
Figure 15:
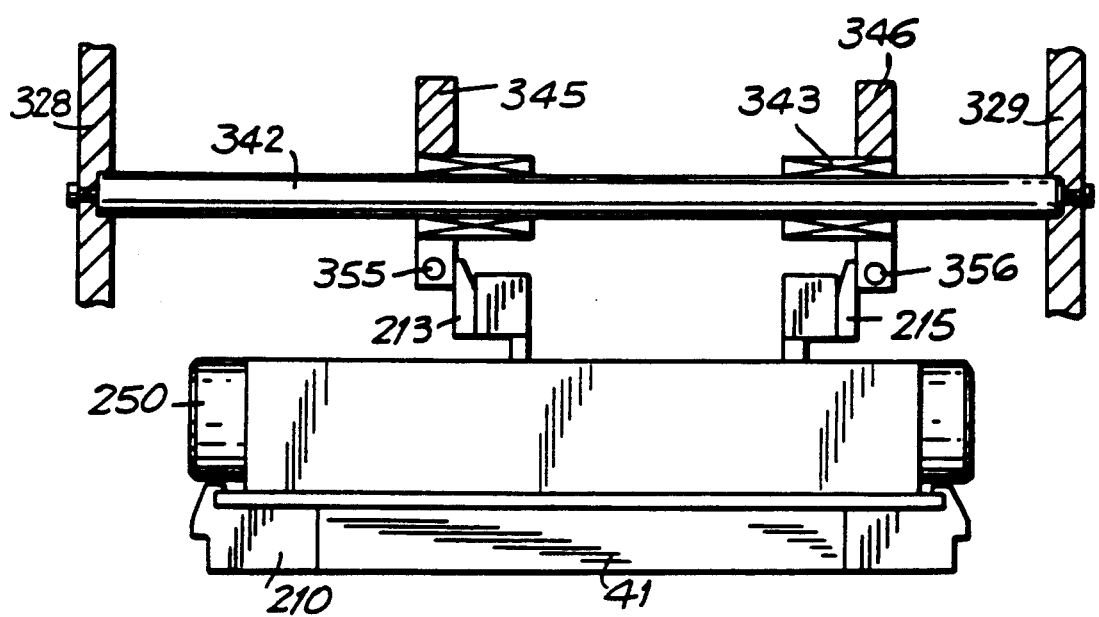
FIG. 15 is a front view of FIG 14.

Referring to FIGS. 14 and 15, positioning unit 300 is provided with the ability to determine the relative location of the support members of a pallet, to compare the determined locations to the desired locations for the next workpiece to be loaded onto the pallet, and to adjust the position of one or more of the support members as necessary. Shaft 342 is aligned with workpiece support arms 214 and 216 of pallet 210 and crosses the conveyor with its ends supported in side plates 328 and 329. Shaft 342 includes two movable sleeves 343 and 344 which have appendages 345 and 346 for connecting to piston rods 347 and 348 and linear measurement transducers 349 and 350. Pistons 349 and 350 are connected to frame arms 351 and 352. Linear measurement transducers 349 and 350 are connected to the frame by support means 353 and 354. Such linear transducer devices may be, for example, model no. LCPX, supplied by Penny & Giles, of Blackwood, Glent, UK.

The position of supporting members 213 and 215 of pallet 210 may be determined by positioning unit 300 as follows. Movable sleeves 343 and 344 on shaft 342 are advanced from a predetermined outward position by cylinders 347 and 348. Advance of a given sleeve is stopped when the sleeve appendage contacts the outward surface of the associated support member. A contact sensor on each of appendages 355 and 356 may be used to determine when contact is made.

During the advance of appendages 345 and 346, associated linear transducers 349 and 350 move rigidly with sleeves 343 and 344 and thus provide signals corresponding to the measured or determined distances from the predetermined outward positions to the location of the sleeve. When advance of the sleeve is halted, the signals correspond to the distance between the point of contact of each appendage with a support member and the predetermined position, thus indicating the locations of the supporting members on the pallet. The distance signals, one for each supporting member, are then provided to the microprocessor device that controls the pallet movement and the positioning unit to adjust the support members.

The microprocessor then can process the signals and determine the distance and direction each support member must be translated, if at all, to move the support members from the determined locations to the desired locations for the next workpiece that is to be placed on that pallet. The microprocessor then can send instructions to motor drive units 324 and 325 to rotate accordingly gears 314 and 315 to effect the desired movement. Preferably, the microprocessor converts the measured distances into encoder impulse control signals to be inputted to the motors, which signals are related to the number of turns that the threaded bars 304 and 305 on pallet 210 must rotate. Thus, it is possible that support members 213 and 215 can be moved asynchronously or synchronously in the same or different directions as necessary.

In the preferred illustration of the second embodiment of the invention, pallet 210 is lifted off the conveyor to a predetermined height at which point gears 314 and 315 of positioning unit 300 engages gears 221 and 230 of pallet 210. In an alternate illustration, positioning unit 300 could be lowered onto pallet 210 from above while pallet 210 is advancing of the conveyor, or held in place. In yet another embodiment, because of the nonvertical angle of contact between the gears of the pallet and the positioning unit, the positioning unit could be maintained in horizontal alignment with the pallet to be adjusted and translated horizontally into position.

The means for determining the location of the support members could be incorporated into any embodiment of the invention, for example, the positioning unit of the first embodiment (not shown) by placing a contact sensor on an appendage to a carriage such as a bushing, placing the carriage at an outer most position and moving the carriage inwardly until the carriage appendage contacts the associated support member, more preferably, a portion of the support member configured to cause the carriage to stop in alignment for engagement with the pallet. Then, the positioning unit can engage pallet and make the appropriate adjustment based on the determined distance and the desired location of the support members. Following adjustment and disengagement of the pallet, the carriage would be returned to its outermost position for the next pallet support member.

The second embodiment of the present invention has several advantages over the first embodiment, including, for example, an adjustment mechanism on the pallet that is less susceptible to damage or interference from dirt, less susceptible to wear on the support members in that the forces are exerted on the toothed gears rigidly mounted in the pallet rather than on the support member itself, a design that eliminates the locking means and its complexities, support members that can be moved independently in an improved manner, and, in the event it becomes necessary, support members that can be adjusted manually by rotating the gears fixed on the pallets with a tool such as a screwdriver.

Referring to FIGS. 16–23 a third embodiment of this invention comprises a pallet 410 and a positioning unit 411. Pallet 410 includes a plate 409 attached to a base 401 that is adapted for contact with a pair of conveyor belts 402 for transport between workstations. Base 401 and plate 404 have respective holes that are at least in part superimposed to form an aperture 404 through pallet 410. Pallet 410 also includes a guide 412 which is mounted to plate 409, and support members 413 and 415 which are slidably mounted on guide 412. In the discussion that follows, two support members are described which have a substantially similar construction and which are mirror images of each other. Accordingly, the discussion will at times refer to both support members in the distributive, i.e., element A and B, where A corresponds to an element of one support member and B corresponds to the same element of the other support members, and at other times only with respect to one of the support members. It is to be understood, however, that in alternate embodiments, more than two support members that are similar in construction could be used.

Support members 413 and 415 have respective support arms 414 and 416 that are adapted to support a workpiece 417. In the preferred embodiment, workpiece 417 comprises an armature for an electric motor and the production line machines armatures.

Figure 16:
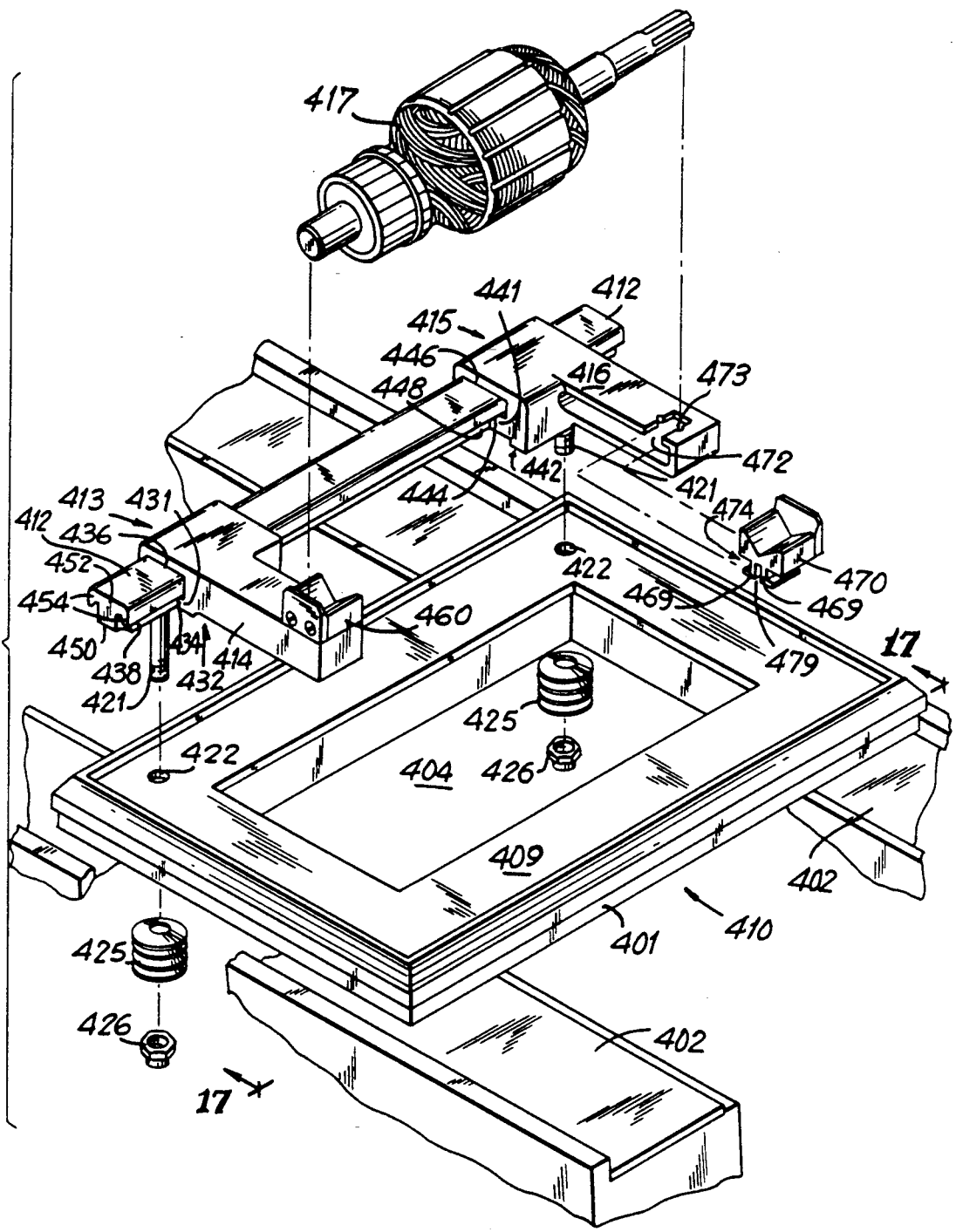
FIG. 16 is a front elevated perspective, exploded view of a third embodiment of the pallet of the present invention.
Figure 17:
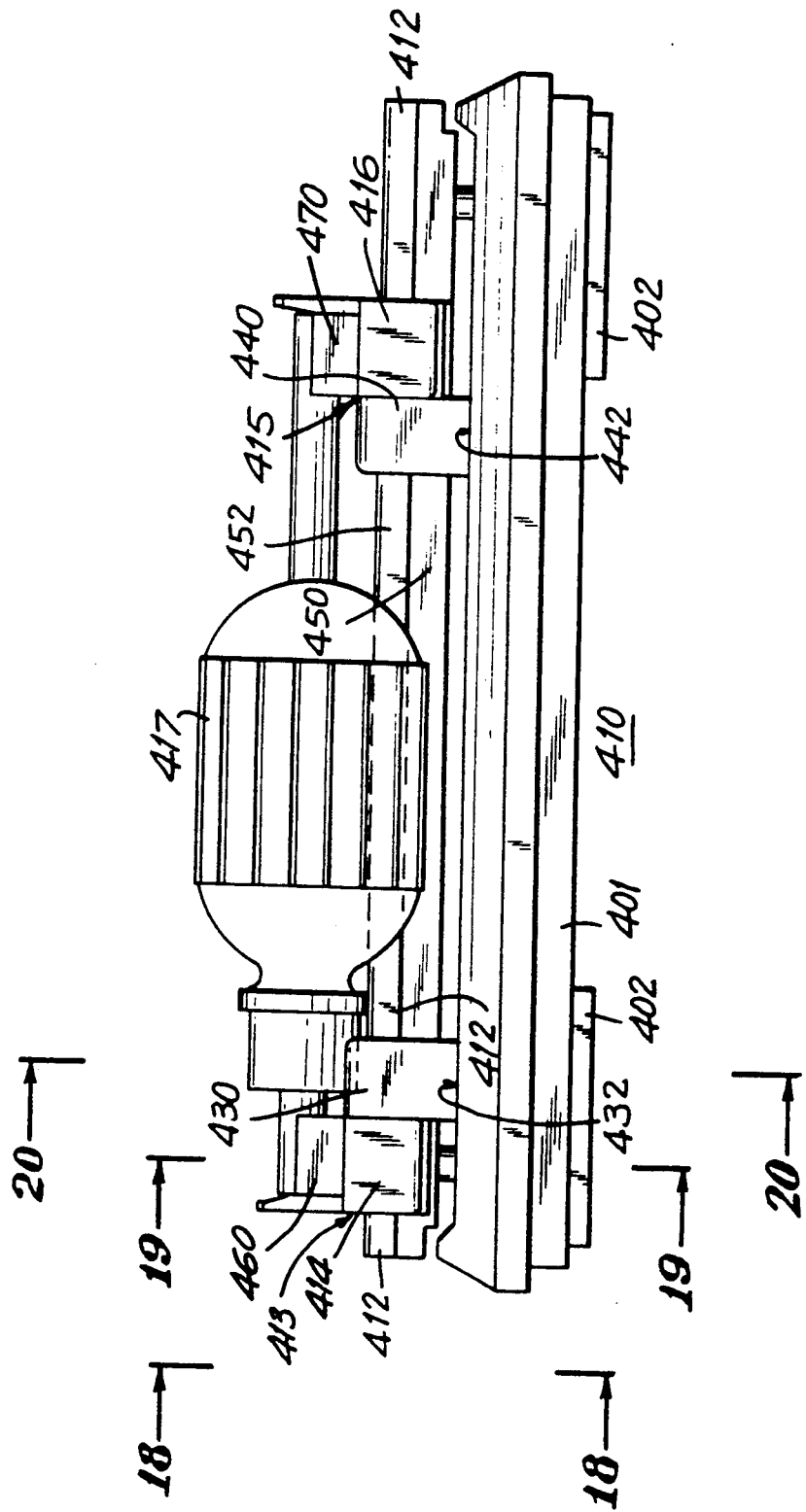
FIG. 17 is a front view of an assembled pallet taken along line 17—17 of FIG. 16.
Figures 18, 19:
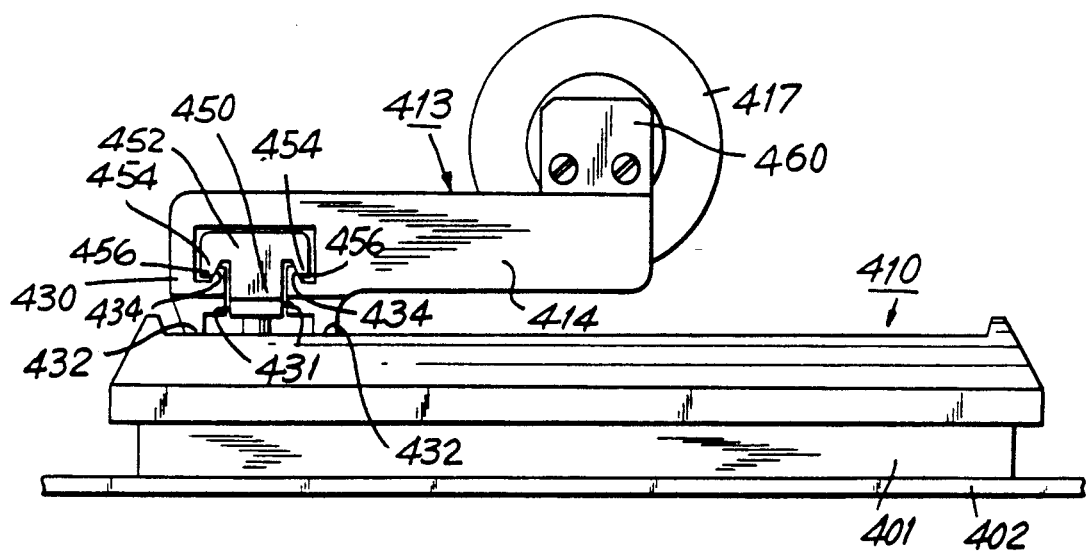
FIG. 18 is a side view taken along line 18—18 of FIG. 17.
FIG. 19 is a side sectional view taken along line 19—19 of FIG. 17.
Figure 20A:
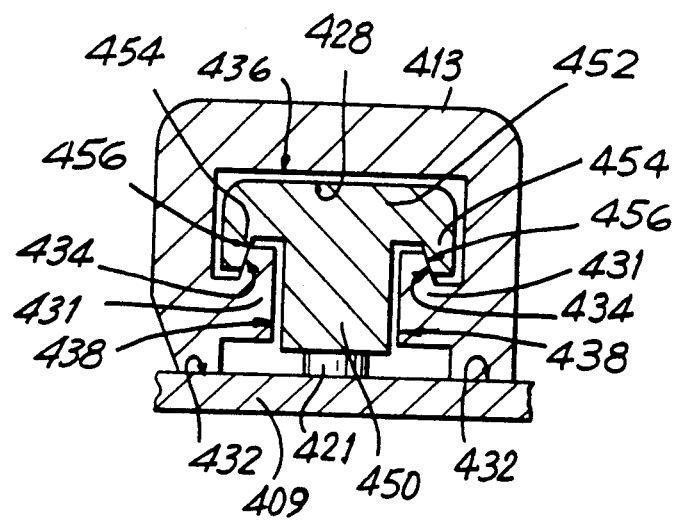
FIG. 20a is an enlarged view of a portion of FIG. 20.
Figure 20:
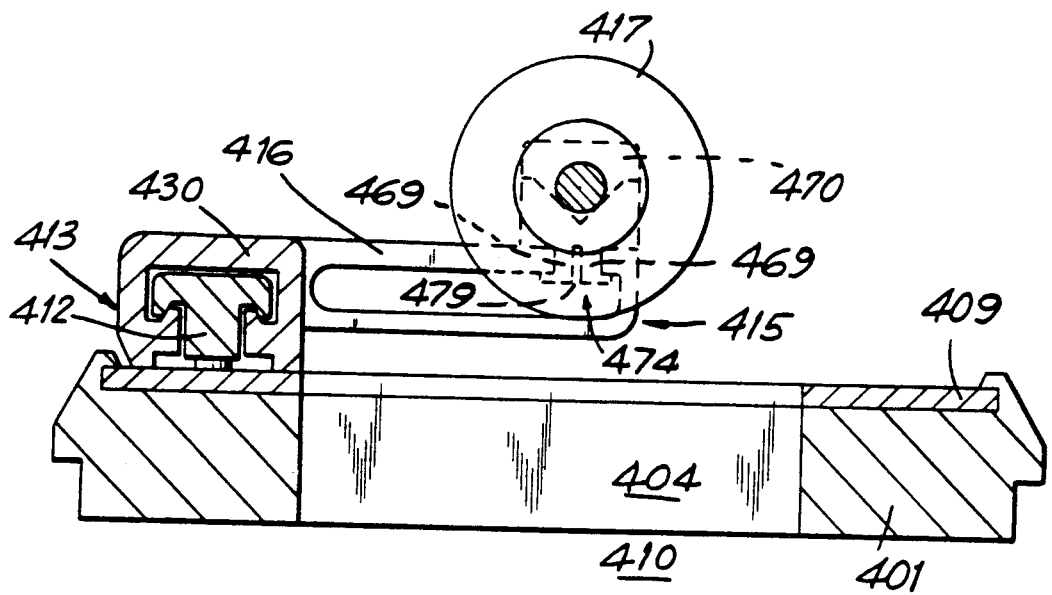
FIG. 20 is a side sectional view taken along line 20—20 of FIG. 17.

Referring to FIGS. 16 and 19–20, guide 412 is an elongated member. Two pins 421 are secured to the guide 412, preferably by a threaded connection, and preferably with one pin being located near each end of guide 412. Pins 421 pass through respective bores 422 in plate 409 and extend into respective receptacles 423 in base 401 The ends of pins 421 in receptacles 423 are threaded.

Springs 425 are mounted over pins 421 in receptacle 423 and nuts 426 are threaded over the ends of pins 421 in the receptacles, thereby securing springs 425 between plate 409 and nuts 426. Springs 425 cause pins 421 to urge guide 412 towards plate 409. The tension of springs 425 may be selected by screwing nuts 426 or pins 421 to preload the biasing force urging guide 412 toward pallet 410. Springs 425 are preferably discoidal springs of conventional construction capable of exerting an appropriate biasing force. In the preferred embodiment, a biasing force of approximately 44 pounds has been found to be appropriate. When more than one releasably securing means is used the total force is equally shared by each means, i.e., for two discoidal springs spaced apart, each spring would provide approximately 22 pounds of force.

Support members 413 and 415 have respective slide blocks 430 and 440, bearing surfaces 432 and 442, bearing surfaces 434 and 444, and bearing surfaces 436 and 446. Referring to FIGS. 16 and 19–20, slide blocks 430 and 440 include a housing adapted to fit over a length guide 412 in a loose fitting manner as described below. The interior configuration of the slide sections is preferably a female complement of the male structure of guide 412. Slide blocks 430 and 440, and bearing surfaces 432, 434, and 436 and 442, 444 and 446 are preferably long and wide enough to contact a length of guide 412 or pallet plate 409 to be stable in its intended retention and sliding functions.

Bearing surfaces 432 and 442 are adapted to contact an opposing bearing surface on plate 409. When the pallet is in the first condition, springs 425 act on guide 412 to hold bearing surfaces 432 and 442 of support members 413 and 415 against plate 409 with sufficient force that friction will prevent support members from moving along guide 412 or plate 409 whether or not the support members are supporting a workpiece. It is to be understood that the frictional force must be sufficient to prevent unintended and inadvertent movement of the support members as a result of being in the conveyor production line assembly environment and subjected to vibrations, accelerations, decelerations, turning corners, repeated loading and unloading cf workpieces and certain other anticipated forces applied parallel to the guide axis. Appropriate frictional forces are in the range of approximately 15 pounds for each support member. The base of guide 412 may or may not be in contact with pallet plate 409 in the first condition. When the pallet is in the second condition, bearing surfaces 432 and 442 may slide across plate 409, whether or not surfaces 432 and 442 are in contact with plate 409 during such movement.

Bearing surfaces 434 and 444 are adapted to contact guide 412. When the pallet is in the first condition, the forces exerted on guide 4!2 by springs 425 urges guide 412 against bearing surfaces 434 and 444 which forces in turn cause bearing surfaces 432 and 442 to contact frictionally plate 409. When the pallet is in the second condition, surfaces 434 and 444 may slide across or along guide 412 whether or not surfaces 434 and 444 are in contact with guide 412 during such movement.

Bearing surfaces 436 and 446 are adapted to contact the top surface 428 of guide 412 which is preferably a bearing surface. When the pallet is in the first condition, surfaces 436 and 446 are preferably not in contact with top surface 428 of guide 412. When the pallet is in the second condition, surfaces 436 and 446 may be in contact with surface 428 of guide 412 and are adapted for sliding therealong during movement of the support members.

In the preferred embodiment, guide 412 has a T-shaped ccnfiguration including a stem area 450 having a vertical axis, a cross member area 452 having a horizontal axis attached to stem 450, and a pair of protrusions 454 extending from the ends of cross member 42, and slide blocks 430 and 440 of support members 43 and 415 each have a pair of protrusions 431 and 441 that interfit with corresponding guide protrusions 454. Cross member 452 includes top surface 428 opposite stem 50. Protrusions 454 each include bearing surfaces 456 which are beveled at an angle relative to the axis of stem 450 preferably between 0° and 90° and more preferably at about an acute angle of approximately 20° relative to the vertical axis of stem 450. Slide portion protrusions 431 and 441 also have bearing surfaces 438 and 448 which are disposed on opposite sides of stem 450 of guide 412 and which may or may not be beveled relative to the stem axis. Beveled surfaces 456 are thus adapted to contact bearing surfaces 434 and 444 of support members 413 and 415 to hold frictionally support members 413 and 415 against guide 412 and plate 409 in the first condition.

To place the pallet in the second condition so that the support members 413 and 415 may be moved, an external force is applied to each of pins 421 (or nuts 426 depending upon which element is presenting to the release means) sufficient to counteract the biasing force of springs 425 so that the friction between the bearing surfaces of plate 409, guide 412 and support member slide portions 430 and 440 is sufficiently reduced that support members can be manually or automatically pushed across and along guide 412 and plate 409 to desired locations. Preferably, such an external force is equal to the biasing force, although it could be slightly greater than or less the biasing force. Thus, when the releasably securing means exerts a force of 44 pounds to hold the guide against the support members in the first condition, the release means applies a force of 44 pounds opposite to the biasing force to place the pallet in the second condition. In the preferred embodiment, the pallet and guide are manufactured from metal such as steel and the support members are manufactured from a plastic material such as nylon or delrin containing approximately 20% glass. Accordingly, the forces exerted by the releasably securing means and the release means may be adjusted to provide sufficient control over movement of the support members without introducing excessive wear of the materials in sliding contact.

An external force may be applied by a release means as described below or manually using an appropriate tool. In the latter regard, a notch (not shown) may be provided between one end of guide 412 and plate 409 for receiving a lever device such as a crowbar which can be used to pry guide 412 a distance away from plate 409 to permit movement of support members 413 or 415 manually.

Slide blocks 430 and 440 of support members 413 and 415 are mounted on guide 412 with a loose mechanical fit. The mechanical tolerances are in the range of 0.1 to 0.2 mm such that the narrowest of the gaps between the surfaces is approximately 0.1 mm between bearing surfaces 438 and 448 of blocks 430 and 440 and the opposite sides of stem 450 of guide 412. This tolerance a permits movement of support members 413 and 415 along guide 412, more particularly movement guided by stem 450, when the pallet is in the second condition without derailing the support members.

Figure 22:
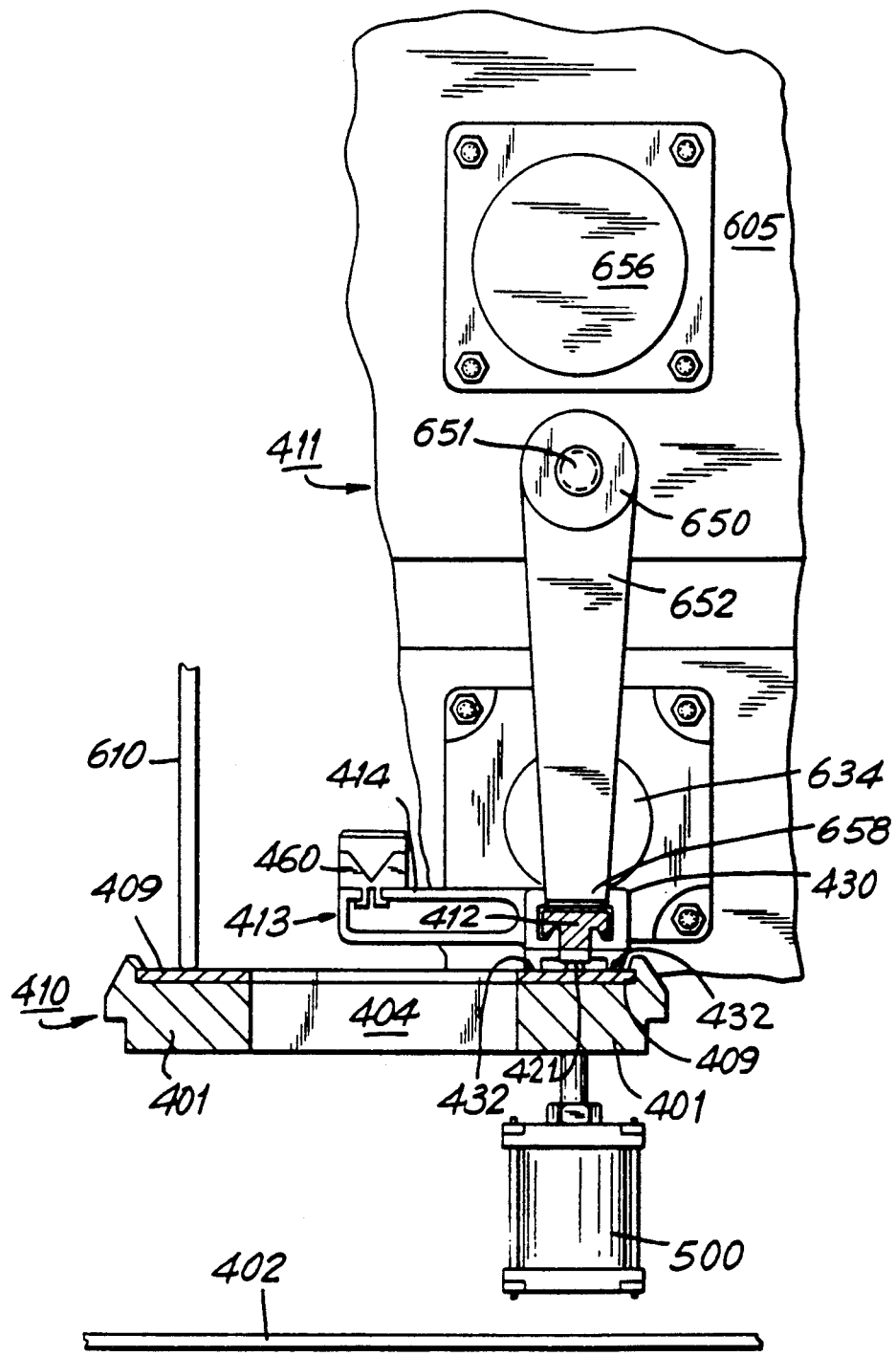
FIG. 22 is a side sectional view taken along line 22—22 of FIG. 21.
Figure 23:
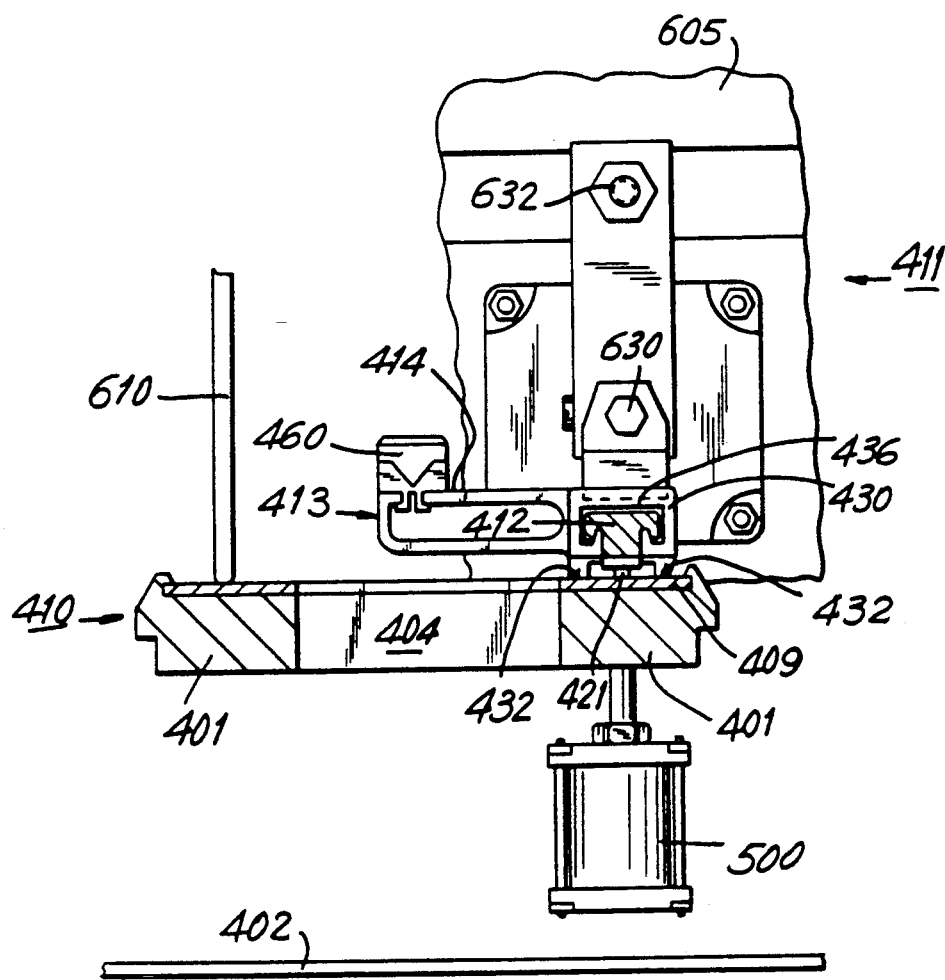
FIG. 23 is a side sectional view taken along line 23—23 of FIG. 21.
Figure 24:
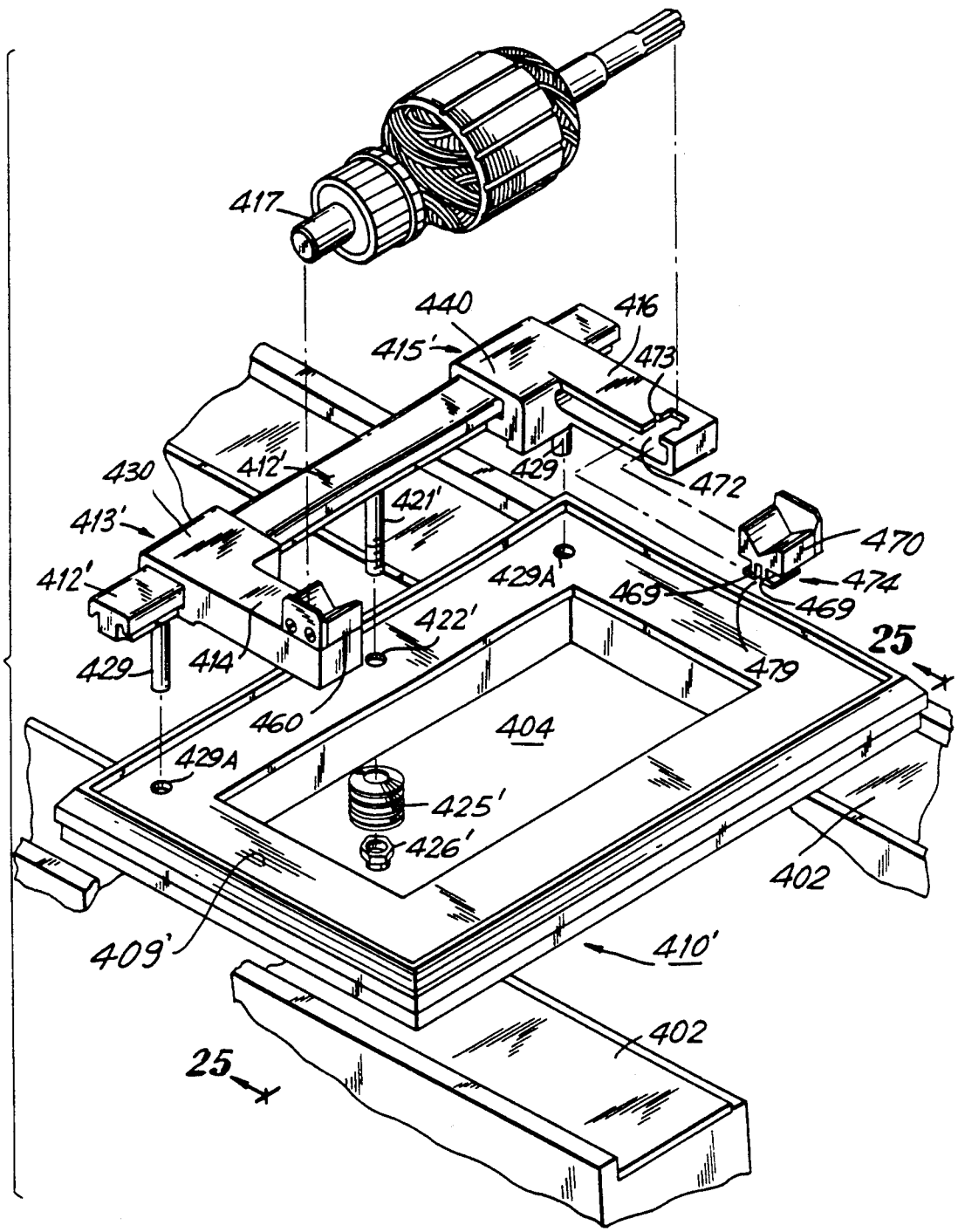
FIG. 24 is a front elevated perspective, exploded view of a fourth embodiment of the pallet of the present invention.
Figure 25:
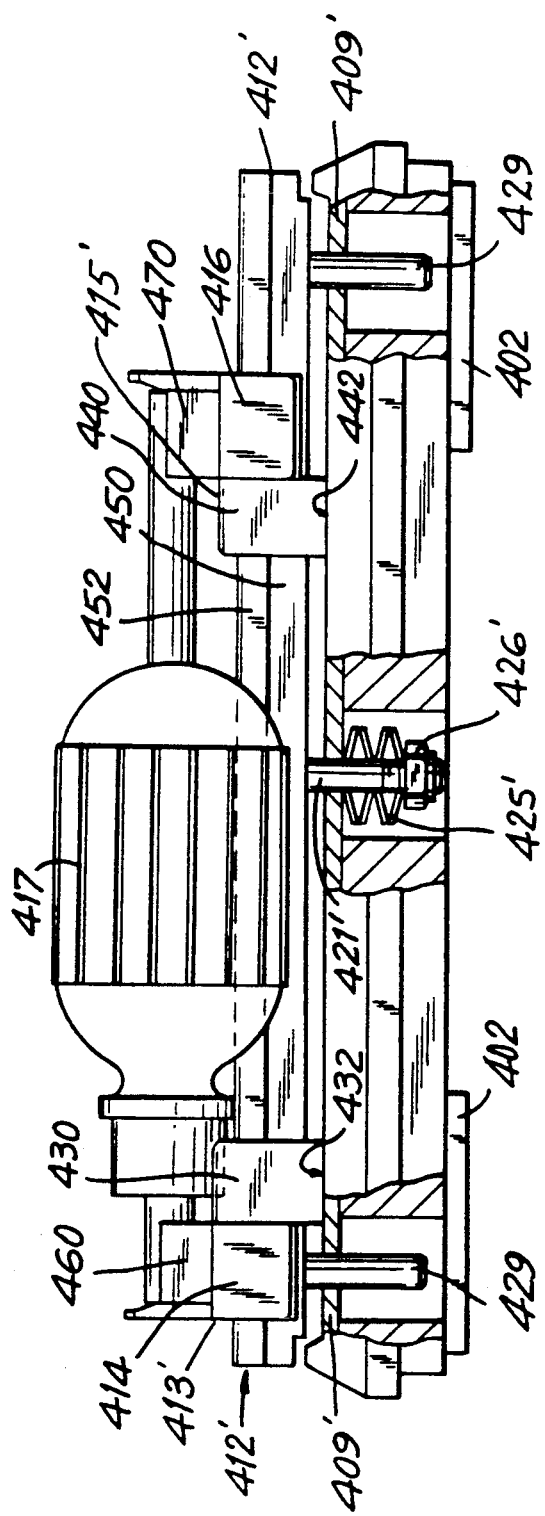
FIG. 25 is a front view of an assembled pallet taken along line 25—25 of FIG. 24.

Referring to FIGS. 24 and 25, in an alternate embodiment the means for releasably securing guide 412' to pallet 410' is a combination of a single pin 421', spring 425', and nut 426' arranged in the same manner as described above in connection with the embodiment depicted in FIGS. 16–23. In this alternate embodiment, a means for preventing rotation of guide 412 when the pallet is in the second condition is provided. For example, a pair of locating pins 429 are secured to guide 412', preferably threadably interconnected, and adapted to pass through corresponding bores 429A in plate 409' of pallet 410'. Pins 429 are adapted for reciprocation in bores 429A and are provided to maintain guide 412' properly oriented on pallet 410' when pallet 410' is in the second condition. Pin 421' is preferably located under the center of mass of guide 412' to accommodate better the different torques that support members 413' and 415' will exert on pin 421' as the support members are moved along guide 412' within their extreme ranges of motion.

In the preferred embodiment, workpiece 417 is suspended over aperture 404 during transport. Aperture 404 allows the passage of a lifting means through the aperture to lift workpiece 417 off pallet 410 from below to a workstation or off the production line. Workpiece 417 is supported on support members 413 and 415 on v-shaped seat members 460 and 470.

Referring to FIGS. 16, 19–20, and 24, v-shaped seat members 460 and 470 are releasably connected to arms 414 and 416 of support members 413 and 415. V-shaped members 460 and 470 include, in addition to the v-shaped seat section for receiving a workpiece 417, resilient guide means 464 and 474. Each guide means includes a pair of resilient flanges 469 separated by a space 479. Space 479 is preferably in the range of from about 2.0 to about 4.0 mm.

Support member arms 414 and 416 respectively contain cut-out portions (see, e.g., cut-out 472 on FIG. 16) a receptacle for receiving resilient guide means (see guide means 474, FIG. 16) of v-shaped members 460 and 470. The dimensions of the cut-outs are selected so that the resilient guide means will be frictionally retained in the cut-outs. More particularly, the distance between the outermost surfaces of a pair of flanges 469 is greater than the corresponding dimension of the receptacles. Thus, when inserted, paired flanges 469 will be compressed and frictionally retained in the cut-outs. Flanges 469 may be further provided with bosses on their respective outward side for interfitting with corresponding notches in the cut-outs (see, e.g., notches 473 in cut-out 472). This will facilitate centering and retention of v-shaped seat members 460 and 470 in support members 413 and 415 for precise adjustment of the v-shaped seats relative to the desired locations of their respective support members.

One advantage to using v-shaped seat members having resilient guide means frictionally interconnected with the support members is that it provides for rapid replacement of the v-shaped seat members when worn members need to be replaced or different seat members are to be used. For example, seat members may be of different shapes and sizes to accommodate different workpiece configurations, such as armature shaft diameters, shaft lengths, and overall armature dimensions. The resilient members thus save time and money in reducing down time for changing the seat members.

Figure 21:
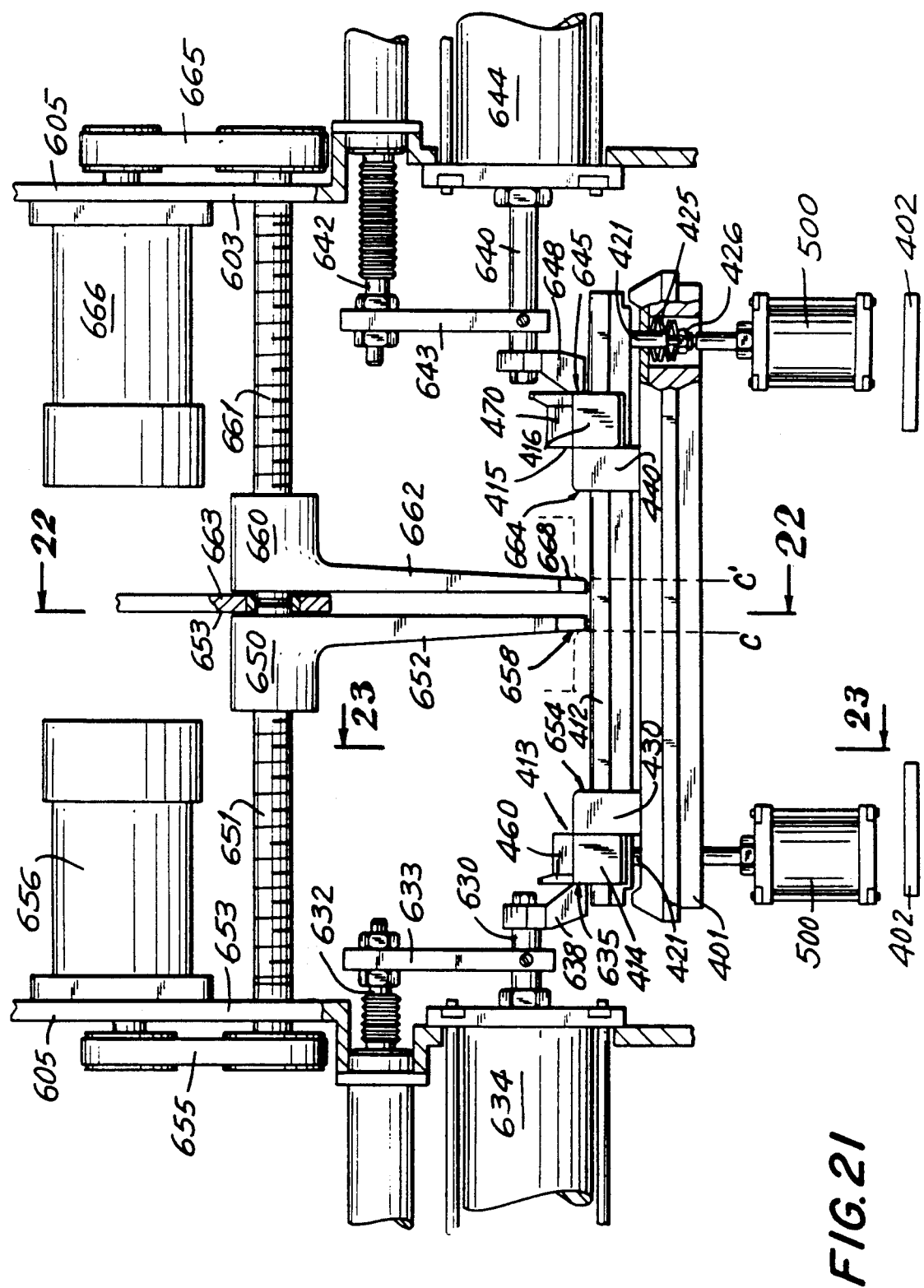
FIG. 21 is front view of a pallet and positioning unit of the present invention.

Referring to FIGS. 21–23, a release means 500 is depicted. Release means 500 is adapted for contacting the means for releasably securing the support members to the pallet to place the pallet in the second condition. There is preferably one release means 500 for each releasable means.

For example, in the aforementioned preferred embodiment of pallet 410 having each means for releasably securing the support members to the pallet 410 include spring 425 confined between plate 409 and nut 426 and around pin 421 to urge the support member against plate 409, each release means 500 is adapted for contacting one of pin 421 or nut 426 and compressing spring 425, thereby conteracting the biasing force and reducing the forces exerted by guide 412 on support members 413 and 415. Thus, actuation of release means 500 places pallet 410 in the second condition so that the support members may be translated. Such a release means 500 is preferably a linear actuator which may be an air cylinder having a pushrod. It is to be understood that release means 500 may be associated with (1) the pallet conveyor line in that they are stationary and the pallets are manipulated into position relative to the release means, (2) a positioning unit and relatively moved into position proximate to the pallet as the pallet and positioning unit are moved into engagement (not shown) or (3) each pallet in that it is a part of the pallet.

Referring to FIGS. 21-23, positioning unit 411 includes pushrods 630 and 640 having contact surfaces 633 and 648 for respectively contacting portions 635 and 645 of support members 413 and 415, and arms 652 and 662 having contact surfaces 658 and 668 for respectively contacting portions 654 and 664 of support members 413 and 415 as described below. Pushrods 630 and 640 are respectively connected to air cylinders 634 and 644. These cylinders advance and retract the pushrods.

Positioning unit 411 also includes linear measurement transducers 632 and 642, preferably linear potentiometers, which are respectively connected to pushrods 630 and 640 by brackets 633 and 643. Thus, as cylinders 634 and 644 advance and retract pushrods 630 and 640, the distance of the pushrods from a predetermined rest position, i.e., their outermost position in their range of motion, can be monitored and measured using the respective linear measurement transducers 632 and 642. More particularly, the potentiometers produce a signal correlated to the amount of extension of the potentiometer which signal can be converted into a measurement of distance from the rest position. Air cylinders 634 and 644 and linear measurement transducers 632 and 642 are connected to frame 605 of the positioning unit.

Positioning unit 411 also includes arms 652 and 662 which are suspended from slides 650 and 660, which in turn are mounted on threaded rods 651 and 661. Rods 651 and 661 are mounted in bearings 653 and 663 in frame 605 and preferably are axially aligned in parallel to each other and to the axis of guide 412 of a pallet having support members 413 and 415 to be adjusted. Rods 651 and 661 are connected to drive means 656 and 666 by a conventional pulley and belt arrangement 655 and 665. Drive means 656 and 666 are preferably conventional DC motors having encoders so that rods 651 and 661 can be independently rotated to locate arms 652 and 662 precisely at any desired location along the axis of rods 651 and 661 respectively. Preferred motors include the aforementioned model R220 manufactured by Parvex. The DC motors are preferably conventionally controlled by a microprocessor.

In operation, positioning unit 411 is initially at a rest condition wherein pushrods 630 and 640 are disposed at one end of their extreme range of motion, preferably as far apart as possible, and arms 652 and 662 are disposed at one end of their extreme range of motion, preferably as close together as possible. A pallet 410 is brought into proximity to positioning unit 411. Positioning unit 411 is provided with a plurality of rods 610, for example, three rods (only one rod is shown in FIGS. 22-23), spaced apart to contact pallet 410. Rods 610 provide a stop to fix the pallet in the proper location and planar orientation relative to the positioning unit for the automatic adjustment operation.

Once the pallet is in the desired position, cylinders 634 and 644 are actuated to advance until contact surfaces 638 and 648 respectively contact the outer portions 635 and 645 of support members 413 and 415 of pallet 410. The cylinders provide a gas pressure of about 2 to 3 atmospheres to advance the contact surfaces to contact the support members. It is to be understood that the cylinders are independently actuated and the contact surfaces of the pushrods may not contact their respective support members simultaneously. When contact is made, linear transducer devices 632 and 642 provide respective signals corresponding to the distance of the support members from the rest position of the corresponding pushrod. These values are processed by the microprocessor in order to determine the locations of the support members. The determined locations are then compared to the desired locations for the selected workpiece 417 that is to be supported by the pallet, which workpiece specification is separately provided to the microprocessor.

The microprocessor then determines whether or not the support members are in the desired locations. If they are, then the pallet is disengaged from the positioning unit and returned to the production conveyor line to receive the selected workpiece. If the support members are not in the desired locations, in the preferred embodiment, release means 500 are actuated to place the pallet in the second condition by compressing springs 425, and optionally urging guide 412 away from pallet plate 409, and cylinders 634 and 644 are further independently actuated to advance pushrods 630 and 640 to the other end of their respective extreme ranges of motion, i.e., as close together as possible. For this operation, the cylinders provide a gas pressure or force of about 5 to about 6 atmospheres to move the support members.

Thereafter, pushrods 630 and 640 (and associated potentiometer means 632 and 642) are fully retracted to their respective rest positions. This action translates support members to reference locations c and c' where they are maintained in position proximate to, if not in contact with, arms 652 and 662. In this embodiment, each time support members are to be adjusted they are first translated to the reference locations c and c' which corresponds to a minimum distance between support members.

Following moving the support members to reference locations c and c', DC motors 656 and 666 are driven independently under the control of the microprocessor to rotate threaded bars 651 and 661 to arms 652 and 662 to contact portions 654 and 664 of support members 413 and 415 and to translate the support members in opposite directions along guide 412 to their desired locations on pallet 410. Once the support members are in the desired position, release means 500 are actuated to withdraw and release pins 421 or nuts 426 so that guide 412 presses support members 413 and 415 against pallet plate 409 to maintain the support members fixed in place, thereby returning pallet 410 to the first condition with the support members in the adjusted desired locations.

In a preferred embodiment, air cylinders 634 and 644 exert a first force that is less than the frictional force holding the support members 413 and 415 in place when the pallet is in the first condition, and a second force that is greater than the frictional force, if any, holding the support members 413 and 415 to pallet 410 when the pallet is in the second condition.

In a preferred embodiment, each release means 500 is operated to raise pin 421 and guide 412 a distance sufficient to remove the predominant frictional force acting on support members 413 and 415 as a result of the force exerted by spring 425. In addition, the tolerances between guide 412 and the interior of slide portions 430 and 440 of the support members are loose so that the motion of guide 412 is substantially confined within portions 430 and 440. Thus, the distance that the guide is raised is preferably not so great that (1) the top of guide 412 contacts the support members or (2) the guide raises support members 413 and 415, more particularly bearing surfaces 432 and 442, an appreciable distance from plate 409 for example, less than approximately 3 mm. This distance is preferably minimized so that any waste materials found in the environment of an armature machining production line does not become interposed between the support members and the pallet, and so that movement of the support members along the guide will push any such waste materials out of the way.

Pallet 10 (or 210 or 410) may include an aperture adapted to permit a piston type lifting device for lifting workpiece 17 from pallet 10 (or 210 or 410) to a Workstation, and then to lower the workpiece back to its rest position for transport. Alternately, the workstation may include gripper means for grasping the workpiece from above to transfer the workpiece to and from the workstation.

One skilled in the art will appreciate that the present invention can be practiced by other than the described embodiments, which are presented for purposes of illustration and not of limitation, and the present invention is limited only by the claims which follow.

We claim:

1. In a production line for workpieces having different dimensions including a pallet having support members that are adjustable for supporting the workpieces and means for advancing pallets carrying workpieces, a system for automatic adjustment of the support members of the pallet to desired locations to support a selected workpiece, comprising:

a pallet having a first support member and a second support member, a guide for controlling the direction of travel of the first and second support members, the first and second support members being mounted on the pallet and adapted for translation towards and away from each other along the guide in respective first and second ranges of motion, and means for releasably securing the first and second support members to respective selected locations on the pallet along the guide, said pallet having a first condition wherein the releasably securing means frictionally secures the first and second support members to the pallet and a second condition wherein the releasably securing means permits the first and second members to be moved to desired locations along the guide;

release means for engaging the means for releasably securing the support members and changing the pallet between the first and second conditions;

a positioning unit having means for translating one or both of the support members to their respective desired locations to support the selected workpiece; and means for moving the pallet and positioning unit into engagement so that the means for translating the support members contacts and moves the support members relative to each other when the pallet is in the second condition.

2. The apparatus of claim 1 wherein the guide further comprises a first guide, the securing means further comprises a locking means for locking the first and second support members along the first guide in the first condition, the locking means having a release mechanism adapted for releasing the locking means so that the first and second support members may be moved along the first guide in the second condition, and wherein the positioning unit further comprises said release means, said release means being adapted for actuating the release mechanism of the pallet to place the pallet in the second condition, and wherein the means for translating further comprises a first carriage adapted for engaging one of the first or second support members of a pallet, and a drive means for translating the first carriage parallel to the first guide from a first location to a second location within a range of locations, and wherein said means for moving the pallet and positioning unit into engagement further comprises moving the pallet and positioning unit relative to each other so that when the pallet and positioning unit are in close proximity the release means actuates the release mechanisms of the locking means, thereby placing the pallet in the second condition, the first carriage engages one of the first and second support members, and movement of the first carriage from the first location to the second location moves the support members relative to each other.

3. The apparatus of claim 2 wherein each support member further comprises a slot adjacent the pallet and the locking means and release mechanism further comprises:

a wedge, said wedge being adapted for translation relative to the pallet;

a locking element adapted to fit between said wedge and the slot in a support member;

a spring adapted to urge said wedge against said locking element in the slot, thereby frictionally engaging the support member and pallet, and wherein the release means of the positioning unit further comprises a pin oriented vertically and slidable along a second guide parallel to the first guide and adapted to contact the wedge to compress the spring, thereby disengaging the locking element from the slot of the support member.

4. The apparatus of claim 3 wherein the locking means further comprises a first locking means associated with the first support member and a second locking means associated with the second support member and wherein the release means further comprises a first pin and a second pin respectively associated with the first and second locking means.

5. The apparatus of claim 2 wherein each support member further comprises a projection and the first carriage further comprises a threaded aperture and a first bushing, the first bushing being adapted to engage a projection, and wherein the drive means further comprises a first motor and a first screw passing through and engaging the first threaded aperture of the first carriage, the first screw being longitudinally oriented parallel to the first guide of the pallet and adapted to be controllably rotated by the first motor so that rotation of the first screw will move the first carriage longitudinally along the first screw.

6. The apparatus of claim 5 wherein the first carriage further comprises a second bushing spaced from the first bushing, the first bushing being adapted to engage a projection from the first support member and the second bushing being adapted to engage a projection from the second support member.

7. The apparatus of claim 6 wherein the support members are moved one at a time by the first carriage engaging first one and then the other of the first and second support members.

8. The apparatus of claim 5 wherein the positioning unit further comprises:
   a second carriage having a second threaded aperture and a second bushing, the second bushing being adapted to engage a projection on a support means; and
   a second drive means having a second motor and a second screw passing through and engaging the threaded aperture of the second carriage, the second screw being longitudinally oriented parallel to the first guide of the pallets, and being adapted to be controllably rotated by the second motor so that rotation of the second screw will move the second carriage longitudinally along the second screw.

9. The apparatus of claim 8 wherein the first and second motors are adapted to move the first and second carriages simultaneously.

10. The apparatus of claim 8 wherein the first and second motors are adapted to move the first and second carriages independently.

11. The apparatus of claim 2 wherein the positioning unit further comprises means for determining the location of the first and second support members of the pallet from a predetermined location and means for moving the first and second support members from the determined locations to the desired locations.

12. The apparatus of claim 11 wherein the means for determining the location of the first and second support members further comprise:
   first member associated with a first support member of the pallet and a second member associated with a second support member of the pallet, the first and second members having an outermost position and an innermost position, the outermost position corresponding to the extreme range of motion of the first and second members and the innermost position being inside the outermost position;
   means for moving the first member from its outermost position inwardly until it contacts the first support member and for moving the second member from its outermost position inwardly until it contacts the second support member; and
   means for measuring the respective distances between the outermost predetermined locations of the first and second members and the locations where the members contact the support members.

13. The apparatus of claim 12 wherein the means for moving the first and second members further comprises means for comparing the determined locations of the first and second support members to the desired locations of the first and second support members for the workpiece to be loaded, and means for independently moving the support members from their determined locations to the desired locations.

14. The apparatus of claim 13 wherein the means for driving is adapted for providing an infinite number of intermediate positions between the extreme range of positions.

15. The apparatus of claim 1 wherein the pallet is provided with an aperture and the support members are adapted to provide accessibility to the workpieces from above and below so that the workpieces can be lifted from the support members for unloading or transfer to a work station.

16. The apparatus of claim 1 wherein the pallet further comprises a first surface and a second surface and wherein the releasably securing means further comprises a spring member connecting the guide and the pallet, the spring member exerting a biasing force between the guide and the pallet so that the guide is urged toward said first pallet surface to secure frictionally the first and second support members to the pallet, and wherein the release means further comprises means for applying an external force to the spring member to counteract said biasing force sufficiently to permit the first and second support members to be moved.

17. The apparatus of claim 16 wherein the pallet further comprises an aperture between the first and second surfaces, and the spring member further comprises a pin, a cap and a spring, the pin passing through the aperture in the pallet and having a first end attached to the guide and a second end passing beyond the second pallet surface, the cap being attached to the second end of the pin so that the spring exerts the biasing force between the cap and the second pallet surface.

18. The apparatus of claim 17 wherein the pin is further adapted for reciprocation in the pallet aperture in response to an external force, said reciprocation moving the guide relative to said first pallet surface.

19. The apparatus of claim 17 wherein the spring is a discoidal spring surrounding the pin, the second end of the pin is threaded and the cap further comprises a nut wherein the biasing force exerted by the spring may be selected by rotating the nut on the second end.

20. The apparatus of claim 19 wherein the pallet further comprises means for preventing the guide from rotating about the pin when the pallet is in the second condition.

21. The apparatus of claim 19 wherein the releasably securing means further comprises a first and a second releasably securing means disposed spaced-apart along the guide and wherein the means for applying an external force further comprises a first and a second means for applying a first and a second external force to the first and second releasably securing means respectively and changing the pallet between the first and second conditions.

22. The apparatus of claim 16 wherein the pallet further comprises a first surface and a second surface, each of the first and second support members further comprise a first bearing surface and a second bearing surface, and the first and second support members are mounted to the guide so that, in the first condition, the guide contacts the first bearing surfaces of the support members to urge the second bearing surfaces of the support members in contact with the first pallet surface to secure frictionally the support members to the pallet, and in the second condition the biasing force exerted by the guide on the first bearing surfaces is reduced so that the first and second bearing surfaces can be translated relative to the guide and first surface of the plate.

23. The apparatus of claim 22 wherein the guide further comprises an elongated flange extending along and from the guide wherein, in the first condition, the flange contacts the first bearing surfaces of the support members.

24. The apparatus of claim 22 wherein the the guide further comprises an elongated structure having a T- shaped cross section including a stem and a cross member section, each of the first and second support members further comprise a receptacle wherein the first bearing surface is inside the receptacle and the first and second support members are mounted to the guide so that, in the first condition, the cross member section of the guide is disposed inside the support member receptacles and contacts the first bearing surfaces of the support members to urge the second bearing surfaces of the support members in contact with the first pallet surface to secure frictionally the support members to the pallet.

25. The apparatus of claim 24 wherein the force exerted by the cross member on the first bearing surfaces is reduced when the pallet is in the second condition so that the first and second bearing surfaces can be translated relative to the guide and first surface of the plate.

26. The apparatus of claim 24 wherein the cross member section has an axis and further comprises a first end and a second end, each of the first and second cross member ends having protrusions including a third bearing surface at an angle in the range of from about 0° to less than 90° relative to the axis of the cross member section, said third bearing surfaces being adapted for contacting the first bearing surfaces of the support members in the first condition to secure frictionally the support members to the guide and the first pallet plate surface.

27. The apparatus of claim 24 wherein the releasably securing means further comprises a spring member connecting the guide and the pallet, the spring member exerting a biasing force between the guide and the pallet so that the T cross section of the guide is urged toward the first bearing surfaces of the support members to secure frictionally the first and second support members to the pallet, said spring member being further compressible in response to an external force applied to counteract said biasing force sufficiently to permit the first and second support members to be moved.

28. The apparatus of claim 16 wherein the pallet further comprises an aperture between the first and second surface, and the spring member further comprises a pin, a cap, and a spring, the pin passing through the aperture in the pallet and having a first end attached to the guide and a second and passing beyond the second pallet surface, the cap being attached to the second end of the pin so that the spring exerts the biasing force between the cap and the second pallet surface.

29. The apparatus of claim 28 wherein the pin is further adapted for reciprocation in the pallet aperture in response to an external force, said reciprocation moving the guide relative to said first pallet surface.

30. The apparatus of claim 29 wherein the spring is a discoidal spring surrounding the pin, the second end of the pin is threaded and the cap further comprises a nut wherein the biasing force exerted by the spring in the first condition may be selected by rotating the nut on the second end.

31. The apparatus of claim 30 wherein the pallet further comprises means for preventing the guide from rotating about the pin when the pallet is in the second condition.

32. The apparatus of claim 30 wherein the releasably securing means further comprises a first and a second releasably securing means disposed spaced apart along the guide and wherein the means for applying an external force further comprises a first and a second means for applying a first and a second external force to the first and second releasably securing means respectively and changing the pallet between the first and second conditions.

33. The apparatus of claim 1 wherein the means for translating the first and second support members further comprise:
means for contacting the first and second support members;
means for determining whether or not the first and second support members are in the desired locations for the selected workpiece; and
means for moving the first and second support members relative to each other to the desired locations.

34. The apparatus of claim 33 wherein the means for contacting the first and second support members further comprises:
first and second pushrods having respective contacting surfaces and an extreme ranges of motion including a rest location at one end of the range of motion; and
first and second drive means for respectively driving the first and second pushrods between their rest positions and the other end of the extreme range whereby the drive means respectively stop moving the pushrods when the pushrod contacting surfaces contact a support member.

35. The apparatus of claim 34 wherein the means for determining whether or not the first and second support members are in the desired locations further comprises:
first and second measurement transducers associated with the first and second pushrods for respectively measuring the location of the first and second support members when said pushrods contact said support members;
means for comparing the measured locations of the first and second pushrods to the desired locations for the selected workpiece; and
means for indicating to the moving means whether or not the first and second support members are in the desired locations.

36. The apparatus of claim 35 wherein the respective contacting surfaces of the first and second pushrod further comprise means for releasably interconnecting with a support member, and the first and second means for moving the support members further comprise:
means for actuating the release means to place the pallet in the second condition;
means for causing the contacting surfaces of the first and second pushrods to interconnect with the first and second support members;
means for actuating the first and second drive means to move the first and second support members to their respective desired locations; and
means for disconnecting the contacting surfaces of the pushrods from the support members and the release means from the securing means to secure frictionally the support members in the desired locations.

37. The apparatus of claim 35 wherein the first and second means for moving the first and second support members further comprise:
means for actuating the release means to place the pallet in the second condition;
means for actuating the first and second drive means to extend the first and second pushrods to the other end of their extreme ranges of motion and thereby move the first and second support members to respective reference locations corresponding to the extreme range of motion of the pushrods;

first and second carriages having a respective first and second push members, the first and second push members each having an extreme range of motion including a rest position corresponding to the reference positions of the first and second support members and an extended position corresponding to the rest position of the first and second pushrods, the first and second push members being adapted for contacting the first and second support members at the reference locations and moving the first and second support members to their respective desired locations;

third and fourth drive means for respectively driving the first and second carriages independently to move the first and second support members from the reference locations to the desired locations for the selected workpiece; and means for disconnecting the release means from the securing means to secure frictionally the support members in the desired locations.

38. The apparatus of claim 37 wherein each of said first and second carriages further comprise a threaded surface and each of said third and fourth drive means further comprises a threaded bar and means for rotating said threaded bar for moving the carriage to an infinite number of locations along the threaded bar.

39. The apparatus of claim 38 wherein the pallet further comprises a first surface and a second surface, each of the first and second support members further comprises a first bearing surface and a second bearing surface, and the first and second support members are mounted to the guide so that, in the first condition, the guide contacts the first bearing surfaces of the support members to urge the second bearing surfaces of the support members in contact with the first pallet surface to secure frictionally the support members to the pallet, and in the second condition, the force exerted by the guide on the first bearing surfaces of the support member is reduced so that the support members can be translated relative to the guide and first surface of the pallet.

40. The apparatus of claim 39 wherein the guide further comprises an elongated member having a T-shaped cross section including a stem and a cross member section, each of the first and second support members further comprise a receptacle, said first bearing surface being inside the receptacle, and the first and second support members are mounted to the guide so that the guide cross member section is disposed inside the support member receptacles whereby in the first condition the cross member contacts the first bearing surfaces of the support members to urge the second bearing surfaces of the support members in contact with the first pallet surface to secure frictionally the support members to the pallet.

41. The apparatus of claim 40 wherein the force exerted by the cross member on the first bearing surfaces is reduced when the pallet is in the second condition so that the first and second support members can be translated relative to the guide and first surface of the pallet.

42. The apparatus of claim 40 wherein the cross member section has an axis and further comprises a first end and a second end, each of each of the first and second cross member ends having protrusions including a third bearing surface at an angle in the range of from about 0° to less than 90° relative to the axis of the cross member section, said third bearing surface being adapted for contacting the support members in the first condition to secure frictionally the support members to the guide and the first pallet surface.

43. The apparatus of claim 41 wherein the pallet further comprises an aperture extending through the first and second surfaces and wherein the releasably securing means further comprises a spring member connecting the guide and the pallet, the spring member exerting a biasing force between the guide and the pallet so that the T section of the guide is urged toward the first bearing surfaces of the support members to secure frictionally the first and second support members to the pallet, and wherein the release means further comprises means for applying an external force to the spring member to counteract said biasing force sufficiently to permit the first and second support members to be moved.

44. The apparatus of claim 43 wherein the pallet further comprises an aperture between the first and second surface, and the spring member further comprises a pin, a cap, and a spring, the pin passing through the aperture in the pallet and having a first end attached to the guide and a second end passing beyond the second pallet surface, the cap being attached to the second end of the pin so that the spring exerts the biasing force between the cap and the second pallet surface.

45. The apparatus of claim 43 wherein the pin is further adapted for reciprocation in the plate aperture in response to an external force, said reciprocation moving the guide relative to said first pallet surface.

46. The apparatus of claim 45 wherein the spring is a discoidal spring surrounding the pin, the second end of the pin is threaded, and the cap further comprises a nut wherein the biasing force exerted by the spring in the first condition may be selected by rotating the nut on the second end.

47. The apparatus of claim 46 wherein the pallet further comprises means for preventing the guide from rotating about the pin when the pallet is in the second condition.

48. The apparatus of claim 46 wherein the releasably securing means further comprises a first and a second releasably securing means disposed spaced apart along of the guide and wherein the means for applying an external force further comprises a first and a second means for applying a first and a second external force to the first and second releasably securing means respectively and changing the pallet between the first and second conditions.

49. A pallet for carrying a workpiece having selected dimensions comprising:
a first surface and a second surface;
an elongated guide member;
first and second support members for supporting the selected workpiece, said first and second support members each having a first bearing surface for contacting the first surface of the pallet and a second bearing surface, said first and second support members being mounted on the elongated guide member for movement along the elongated guide member so that the second bearing surface is disposed between the guide member and the first surface of the pallet and the first bearing surface is disposed proximate to the first pallet surface; and
means for releasably securing the first and second support members to the pallet having a first condition and a second condition, the first condition having the guide member contact the second bearing surfaces of the support members with a first force to urge the first bearing surfaces of the support members in contact with the first pallet surface to secure frictionally the support members to the pallet, the second condition having the guide member contact the second bearing surfaces of the support members with a second force that is less than the first force so that the first and second bearing surfaces can be translated relative to the guide member and first surface of the pallet.

50. The apparatus of claim 49 wherein the elongated guide member further comprises an elongated flange extending along and from the guide member wherein, in the first condition, the flange contacts the second bearing surfaces of the first and second support members.

51. The apparatus of claim 49 wherein the guide member further comprises an elongated member having a T-shaped cross section including a stem and a cross member, each of the first and second support members further comprise an aperture, said second bearing surface being inside the aperture, the first and second support members being mounted for movement along the T-shaped guide member so that the guide cross member section is disposed inside the support member apertures whereby in the first condition the cross member section contacts the second bearing surfaces of the support members to urge the first bearing surfaces of the support members in contact with the first pallet surface to secure frictionally the support members to the pallet.

52. The apparatus of claim 51 wherein the cross member section has an axis and further comprises a first end and a second end, each of the first and second cross member ends having protrusions including a third bearing surface at an acute angle in the range of from about 60° to about 80° relative to the axis of the cross member section, said third bearing surfaces being adapted for contacting the support members in the first condition to secure frictionally the support members to the guide and the first pallet surface.

53. The apparatus of claim 51 wherein the releasable securing means further comprises a spring member connecting the guide and pallet, the spring member exerting a first force so that the guide is urged toward said first pallet surface to secure frictionally the first and second support members to the pallet, said spring member being further compressible thereby to exert the second force to permit the first and second support members to be moved.

54. The apparatus of claim 53 wherein the pallet further comprises an aperture extending through the first and second pallet surfaces and wherein the releasably securing means further comprises a pin, a cap, and a spring, the pin passing through the aperture in the plate and having a first end attached to the stem of the guide and a second end extending and beyond the second plate surface, the cap being attached to the second end of the pin so that the spring member exerts the first force between the cap and the second surface of the pallet.

55. The apparatus of claim 53 wherein the pin is further adapted for reciprocation in the pallet aperture, said reciprocation moving the guide relative to said first pallet surface.

56. The apparatus of claim 55 wherein the spring member is a discoidal spring surrounding the pin, the second end of the pin is threaded, and the cap further comprises a nut wherein the first force exerted by the spring in the first condition may be selected by rotating the nut on the second end.

57. The apparatus of claim 56 wherein the pallet further comprises means for preventing the guide from rotating about the pin when the securing means is in the second condition.

58. The apparatus of claim 56 wherein the releasably securing means further comprises a first and a second releasably securing means disposed spaced-apart along the guide.

59. The apparatus of claim 49 wherein each of the first and second support members further comprises respective first and second receptacles, each receptacle having a depth and width, the apparatus further comprising a first seat member and a second seat member for carrying the selected workpiece therebetween, the first and second seat members being adapted to interfit frictionally in the respective receptacles.

60. The apparatus of claim 59 wherein each of the first and second seat members further comprises a first and a second flange extending generally in parallel and in superposition from the seat member, the flanges being paired and having inner surfaces and outer surfaces, each pair of said first and second flanges being separated by a space, resilient, and having outer surfaces spaced apart a distance that is greater than the width of the receptacle so that inserting the flanges into the receptacle provides a frictional fit.

61. The apparatus of claim 60 wherein each of said outer flange surfaces further comprise a boss and wherein each of said receptacles further comprise a notch whereby the flange bosses interfit with a receptacle notch to fit properly the seat members.

62. In a production line for workpieces having different dimensions including a pallet having an elongated first guide, a first support member and a second support member for supporting workpieces mounted on the pallet and adapted for translation towards and away from each other along the guide in respective first and second ranges of motion, the guide controlling the direction of travel of the first and second support members and means for releasably securing the first and second support members to respective selected locations on the pallet along the guide, said securing means having a first condition which frictionally secures the first and second support members to the pallet and a second condition which permits the first and second support members to be moved relative to the pallet along the guide, and a positioning unit having means for contacting the first and second support members and means for translating one or both of the support members to their respective desired locations, a method for adjusting the distance between a first and a second support member of a pallet to support a selected workpiece comprising the steps of:

(a) providing a selected workpiece to be carried by the pallet having dimensions corresponding to a desired location for the support members to carry the selected workpiece;

(b) moving the pallet into alignment with the positioning unit so that the means for contacting the support members will contact the support members to carry the selected workpiece;

(c) actuating the means for contacting the first and second support members to contact independently their respective support members;

(d) placing the pallet in the second condition so that the support members can be moved;

(e) translating the first and second support members relative to each other in a direction controlled by the guide to their desired locations; and (f) placing the pallet in the first condition so that the support members will be frictionally secured in place on the pallet.

63. The method of claim 62 wherein step(c) further comprises (g) determining a first location of the first and second support members on the pallet;

(h) comparing the determined first locations of the support members to the desired locations for carrying the selected workpiece; and, if the determined first locations are different from the desired locations, following steps (d), (e), and (f).

64. The method of claim 62 wherein the means for releasably securing the first and second support members further comprises means for locking and first and second support members to respective selected positions along the guide, the locking means having a release mechanism so that the first and second members may be moved along the first guide in the second condition, and wherein the positioning unit includes a first carriage adapted for engaging one of the first or second support members of a pallet, and first drive means for translating the first carriage parallel to the guide of the pallet, the method further comprising:

moving the first carriage to a position associated with the location of one of the first or second support members;

steps (b) and (d) further comprising moving the pallet and positioning unit together and releasing the locking means;

step (e) further comprising actuating the first drive means in response to the dimensions of the selected workpiece, thereby moving the carriage and the one of the first or second support members to its desired locations; and (step (f) further comprising locking the first and second support members in place and placing the securing means in the first condition.

65. The method of claim 64 further comprising the steps of:

moving the first carriage to a third position associated with the location of the other of the first and second support members, moving the pallet and positioning unit together and releasing the locking means, and engaging the carriage with the other of the first and second support members;

actuating the drive means in response to the dimensions of the selected workpiece, thereby moving the carriage and the other of the first and second support members to the desired fourth position; and moving the pallet and positioning unit apart so that the release means disengages from the release mechanism, thereby locking the first and second support members in place.

66. The method of claim 63 wherein step (g) further comprises determining the first locations of the first and second support members relative to a first and second predetermined rest locations, wherein step (e) further comprises driving the means for contacting in response to the desired locations for the selected workpiece and the determined first locations of the first and second support members, thereby moving the first and second support members relative to each other from the determined first locations to the desired locations.

67. The method of claim 66 wherein the positioning unit includes a first member associated with a first support member of the pallet and a second member associated with a second support member of the pallet, each of the first and second members having a range of motion including an outermost position and an innermost position, the outermost position corresponding to the predetermined rest locations and the innermost position being inside the outermost position, and a means for moving the first member and the second member, wherein step (c) further comprises:

placing the first and second members at their respective outermost positions prior to step (a);

moving the first member inwardly from its outermost position until it contacts the first support member, thereby defining a first distance measured between the predetermined rest location and the location of the first support member; and moving the second member inwardly from its outermost position until it contacts the second support member, thereby defining a second distance measured between the predetermined rest location and the location of the first support member, whereby the first and second determined distances define the first locations of the first and second support members prior to adjustment.

68. The method of claim 67 wherein placing the first and second members at their respective outermost positions occurs after step (b) and before step (c).

69. The method of claim 68 wherein the positioning unit includes a third and fourth member, each of the third and fourth members having an innermost position and outermost position, the innermost positions corresponding to the reference locations and the outermost positions of the third and fourth members corresponding to the rest locations of the first and second members, wherein step (e) further comprises:

translating the first and second members in contact with the first and second support members from the first locations of the support members to the reference locations;

retracting the first and second members to their respective rest locations;

translating the third and fourth members from the reference locations toward their respective outermost positions; and stopping translation of the third and fourth members when the first and second support members are at the desired locations for carrying the selected first and second workpieces.

70. The method of claims 69 wherein the reference locations of the third and fourth members further comprise the outermost locations of the third and fourth members and the rest position of the first and second members further comprise the innermost position of the first and second members.

71. The method of claim 64 wherein the positioning unit includes a second carriage and a second drive means, the first and second carriages being adapted respectively for engaging the first and second support members of a pallet, and the first and second drive means are adapted for respectively translating the first and second carriages parallel to the first guide of a pallet within an extreme range of positions, wherein step (e) further comprises:

moving the first and second carriages to respective first and second positions associated with the positions of the first and second support members on the pallets;

actuating the first and second drive means in response to the dimensions of the selected workpiece thereby moving the first and second carriages and the first and second support members to the desired location for carrying the selected workpiece dimensions.

* * * * *

UNITED STATES PATENT AND TRADEMARK OFFICE
CERTIFICATE OF CORRECTION

PATENT NO. : 5,060,780                                    Page 1 of 2
DATED      : October 29, 1991
INVENTOR(S): Luciano Santandrea and Massimo Lombardi It is certified that error appears in the above-indentified patent and that said Letters Patent is hereby corrected as shown below:

| Column | Line | |
|---|---|---|
| Title page, item [56] | 7 | Change "4,789,505 to --4,787,505--. |
| 3 | 5 | Change "cf" to --of--. |
| 5 | 34 | Change "cf" to --of--. |
| 7 | 67 | Change "&he" to --the--. |
| 8 | 36 | Change "support&" to --support--. |
| 14 | 24 | Change "263" to --260--. |
| 15 | 32 | Change "cf" to --of--. |
| 16 | 56 | Change "of" to --on--. |
| 17 | 57 | After "401" insert a period. |
| 17 | 64 | Change "or" to --on--. |
| 18 | 33 | Change "cf" to --of--. |
| 18 | 45 | Change "4!2" to --412--. |
| 18 | 65 | Change "42" to --452--. |
| 18 | 66 | Change "43" to --413--. |
| 19 | 1 | Change "50" to --450--. |
| 21 | 59 | Change "4!1" to --411--. |
| 22 | 58 | Change "4!2" to --412--. |

UNITED STATES PATENT AND TRADEMARK OFFICE
CERTIFICATE OF CORRECTION

PATENT NO. : 5,060,780
DATED : October 29, 1991
INVENTOR(S) : Luciano Santandrea and Massimo Lombardi It is certified that error appears in the above-indentified patent and that said Letters Patent is hereby corrected as shown below:

| Column | Line | |
|--------|------|---|
| 23 | 25-26 | Change "Workstation" to --workstation--. |
| 33 | 18 | Change "locking and first" to --locking the first--. |

Signed and Sealed this

Thirty-first Day of May, 1994

BRUCE LEHMAN

Attesting Officer    Commissioner of Patents and Trademarks